United States Patent
Taneja et al.

(10) Patent No.: US 10,089,059 B1
(45) Date of Patent: Oct. 2, 2018

(54) MANAGING PLAYBACK OF MEDIA CONTENT WITH LOCATION DATA

(71) Applicant: Audible, Inc., Newark, NJ (US)

(72) Inventors: Shiranchal Taneja, Sammamish, WA (US); Priya Palanisamy, Redmond, WA (US); Amit Kohli, Newcastle, WA (US); Scott Richard Battaglia, Riverdale, NJ (US); Jed Hoffmann, Seattle, WA (US); Thomsun Sriburadej, Seattle, WA (US)

(73) Assignee: Audible, Inc., Newark, NJ (US)

( * ) Notice: Subject to any disclaimer, the term of this patent is extended or adjusted under 35 U.S.C. 154(b) by 397 days.

(21) Appl. No.: 14/673,751

(22) Filed: Mar. 30, 2015

(51) Int. Cl.
*G06F 3/0481* (2013.01)
*G06F 3/16* (2006.01)
*G06F 3/0484* (2013.01)
*G06F 17/30* (2006.01)

(52) U.S. Cl.
CPC .......... *G06F 3/165* (2013.01); *G06F 3/04842* (2013.01); *G06F 17/30752* (2013.01)

(58) Field of Classification Search
None
See application file for complete search history.

(56) References Cited

U.S. PATENT DOCUMENTS

| | | | |
|---|---|---|---|
| 2009/0241017 A1* | 9/2009 | Brooks | G06F 17/30884 715/206 |
| 2012/0216101 A1* | 8/2012 | Yonemoto | G06F 17/30035 715/206 |
| 2012/0310649 A1* | 12/2012 | Cannistraro | G10L 13/00 704/260 |

* cited by examiner

*Primary Examiner* — Andrey Belousov
*Assistant Examiner* — Hamei Jiang
(74) *Attorney, Agent, or Firm* — Lee & Hayes, PLLC

(57) ABSTRACT

Various systems, processes, and techniques may be used to manage media content playback. In particular implementations, systems and processes may include the ability to generate audio output from media content at a user device and detect an indication to move from a current location in the audio output. The systems and processes may also include the ability to determine a number of location indicators for the audio output, the location indicators associated with different locations in the audio output, select one of the location indicators, and generate audio output beginning near the selected location indicator.

23 Claims, 11 Drawing Sheets

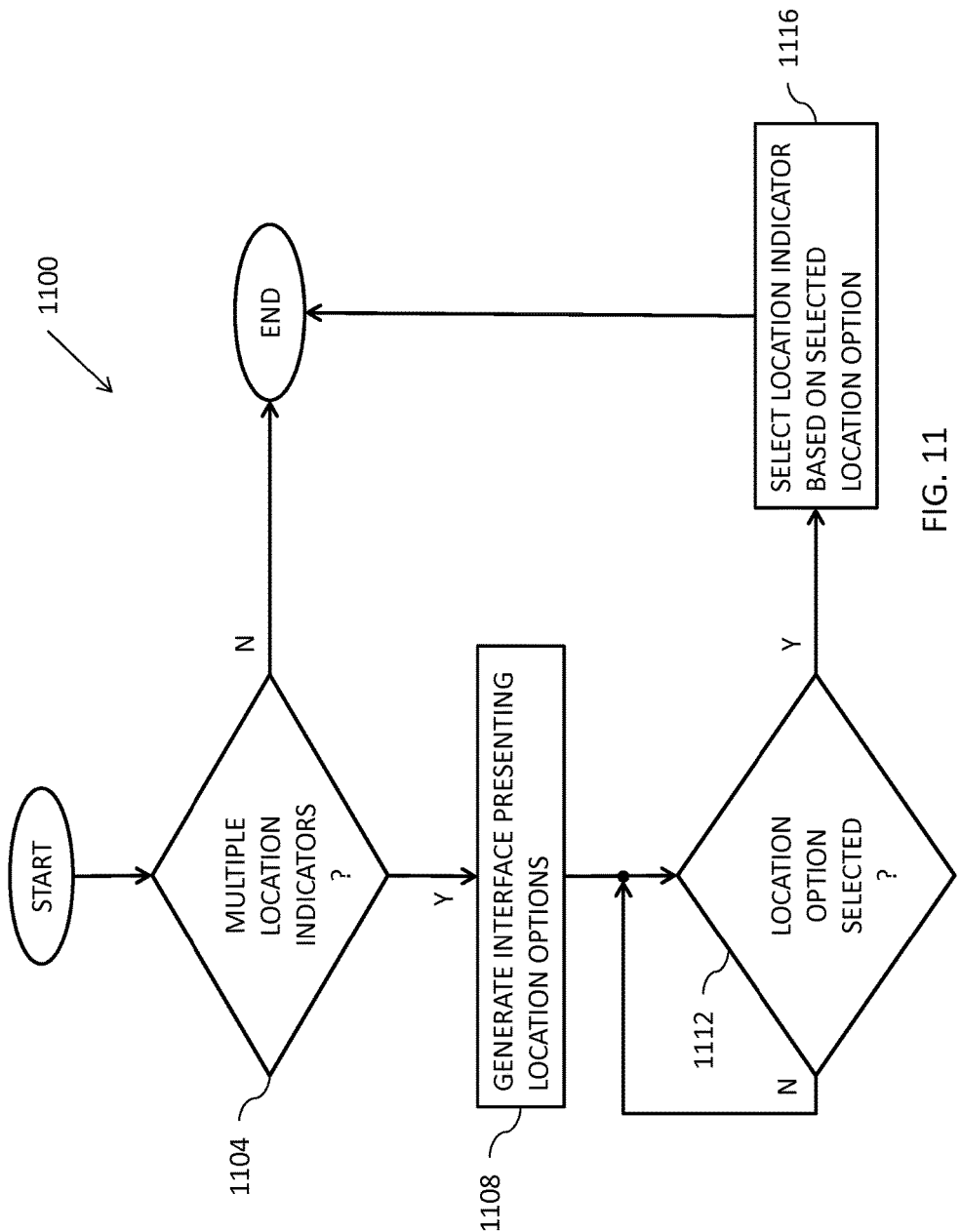

MANAGING PLAYBACK OF MEDIA CONTENT WITH LOCATION DATA

BACKGROUND

Generally described, computing devices may present various types of digital content to users for consumption. For example, computing devices may visually present items of content such as electronic books, movies, television programs and other multimedia content. Similarly, computing devices may audibly present content such as audiobooks, music, movies, and other multimedia content. Some computing devices display an image or album cover associated with the audiobook or audio during playback.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein:

FIG. 11 is a flowchart illustrating an example process for managing media content playback.

DETAILED DESCRIPTION

Figure 1:
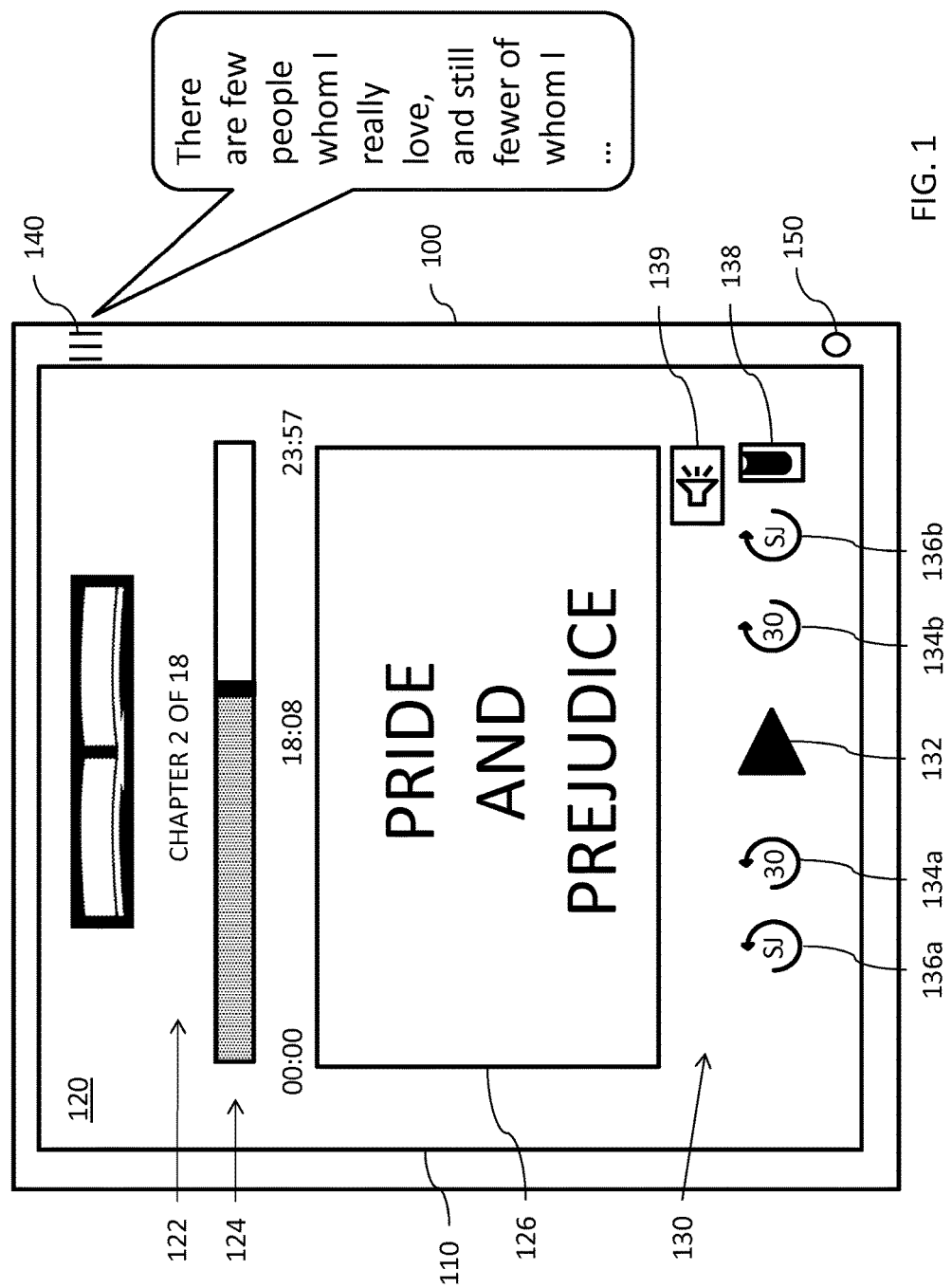
FIG. 1 is a line drawing illustrating an example user device for managing media content playback.

Generally described, aspects of the disclosure are directed to providing an intelligent jump feature during playback of audio content on a user's listening device. For example, a user may use a personal computing device, such as a smartphone, to listen to an audiobook. For a variety of reasons, a user may become distracted while listening to an audiobook and not pay attention to the audio output being generated. If the user wants to go back and rehear the latest content, there is typically no clear way for the user to know where to go back to since they were distracted. Rudimentary features like jumping back a given time (e.g., 30 seconds) offer only spotty performance. Moreover, searching back through the audio content (e.g., by rewinding) may be more effort than it is worth, with a number of overshoots, undershoots, and unpredictable starting locations. Using data about the audio content, however, can provide an intelligent way in which to jump backward (or forward) to a point that may have relevance to the user.

Data regarding audio content may be generated from a variety of sources. For example, the user may have previously marked certain locations in the audiobook (e.g., with bookmarks, highlights, etc.). Additionally, an analysis of the audiobook itself may locate natural breaks in the audiobook (e.g., chapter breaks, section breaks, etc.). This analysis may also be obtained and/or supplemented by analyzing the underlying text associated with the audiobook.

In particular implementations, the text associated with the audiobook may be analyzed to determine locations of potential interest. For example, the locations at which main characters are introduced or where the action of the story begins to rise may be determined. An item of textual content and a corresponding item of audio content are sometimes referred to herein as "associated" or "companion" content.

In certain implementations, data regarding the audiobook may be obtained from others listening to the audiobook and/or reading an associated e-book. For example, in particular implementations, the metadata may be based at least in part on group associations, social network groups, and/or user history associated with the media content. For example, third-party bookmarks and/or highlighting may be reported to a central site, and this information may be sent to the user device and analyzed as potential locations of interest.

The different points of interest in the audiobook are generally referred to as locations. Each location may have a location indicator (e.g., a timestamp in the audiobook) and a location type (e.g., chapter break, section break, user bookmark, third party highlight, etc.)

Using the data regarding locations, an intelligent decision may be made regarding where to restart the audio content. For example, in certain implementations, a priority scheme for location types may be analyzed by the user's listening device. Thus, if a high priority location (e.g., a user bookmark) and a low priority location (e.g., a main character is introduced) are near the current location in the audio content, the higher priority location may be selected as there is a good chance that the user would like to restart the audio content at that location.

In some implementations, the amount of locations under consideration for an intelligent jump in the audiobook may be bounded by a time period. For example, only the locations within a certain period (e.g., five minutes) of the current location may be analyzed in trying to determine a location to restart the audio output.

The intelligent jump feature may also be used in conjunction with a standard time jump feature. When a user indicates that they would like a standard time jump, the area around the destination, which may be at random points in the audio stream, may be analyzed to determine a more appropriate starting place (e.g., user bookmark, main character introduction, paragraph start, etc.).

In some implementations, an item of audio content and a corresponding item of associated textual content may be synchronized with one another for simultaneous presentation. For example, a computing device outputting the media content may be provided with content synchronization information that maps one or more words in the item of associated textual content with a position of an identical word or words in the item of audio content (e.g., the identical word or words that are spoken, sung, recited, etc. in the item of audio content).

In certain implementations, in addition to selecting a location that may be of interest to a user, a further determination of an appropriate location to restart the audiobook near the selected location may be undertaken. For example, even though a bookmarked location may have been selected, the bookmark may not be located at a point that is readily comprehensible to a user. The bookmark may, for example, have been placed where it was for any of a variety of reasons (e.g., the user was suddenly interrupted), but in general, a user listening to an audio book does not understand exactly where the natural breaks in text (e.g., due the to the rules of grammar) would be in a book. Thus, bookmarks may be at random points (e.g., in the middle of a word or sentence), and it could be confusing to the reader to start at the exact location. By analyzing the text associated with given portions of media content (such as textual content of an electronic book ("ebook") version of the same underlying book), an appropriate starting point may be determined (e.g., at the beginning of a sentence or paragraph).

While reference is frequently made herein to audiobooks, books, ebooks, etc., it will be appreciated that media content may include any type of machine-readable content that is presented continuously over time. Examples of continuously presented media content may include audiobooks, podcasts, news programs, musical works, television programs, video clips, movies, multimedia content, video games, and any other type of content stored in machine-readable form. Media content can also include any type of textual content, such as an ebook, electronic table of contents, closed caption content, screenplay, script, libretto, transcription (e.g., speech-to-text) or other textual content. As will be appreciated, in some implementations, textual content representing words spoken in various types of audio content may be determined dynamically using speech recognition and/or other known methods. As will be appreciated, sections of media content may refer to the chapters of a book, episodes of a show, sections of a show defined by advertising and/or commercial breaks, books in a collection, and/or any other type of ordered arrangement of content that may be broken into discrete sections.

FIG. 1 illustrates an example user device 100 for managing media content playback. In the illustrated example, user device 100 is managing audible playback of media content, but in other implementations user device 100 may manage other types of playback (e.g., video) of media content. Media content is generally any machine-stored form of data used to communicate information to humans (e.g., text, audio, and/or video).

User device 100 may generally be any computing device capable of receiving data and presenting it to a user. User device 100 may, for example, be a laptop, a tablet computer, a personal computer, a personal digital assistant (PDA), a hybrid PDA/mobile phone, a smartphone, a wearable computing device, a global positioning system (GPS) device, an electronic book reader, a set-top or other television box, a camera, an audiobook player, a digital media player, a video game console, an in-store kiosk, a television, an electronic device for inclusion in vehicles or machinery, a gaming device, or the like.

In the current example, user device 100 is outputting audio content associated with a book. In other implementations, user device 100 may output audio content associated with other textual items (e.g., magazine articles, screen plays, scholarly papers, patents, or any other textual source). Additionally, user device 100 may output audio content that is not associated with an underlying textual item. For example, the media content may just be audio content (e.g., from a speech) or partial audio content (e.g., video).

User device 100 includes a display 110 that presents a user interface 120 during playback of media content. User device 100 may audibly present media content via one or more speakers 140 and/or one or more audio jacks 150.

User interface 120 may be generated in part by the user device 100 and/or a remote content server system, examples of which is described in further detail below. User interface 120 includes, among other things, a general location reference 112 (designating the current chapter in this example) and a specific location reference 124 (indicating the total time of the current chapter and the current time location within the chapter in this example). User interface 120 also includes a portion 126 presenting visual information associated with the media content item. In the current implementation, the visual information is just the title of the book, but in other implementations, it may include pictures, the current text being output audibly, or other associated information.

At the bottom, user interface 120 presents icons 130 for a number of user control functions. In this implementation, user device 100 includes a touch sensitive layer (not shown) to detect user interaction with the icons. Icons 130 include a play button 132, a fixed jump back button 134a, and a fixed jump forward button 134b. In this implementation, the fixed jump back and jump forward is 30 seconds. The user may adjust this amount in user preferences for user device 100. Icons 130 also include a smart jump back button 136a, a smart forward back button 136b, a bookmark button 138, and a mute button 139. In other implementations, icons 130 may be replaced by physical devices (e.g., buttons, slider bars, etc.). As illustrated by the example, jumping from an audio output location means to move from the current location in the audio output to a location in the audio output that is not contiguous with the current location. The second location may be previous to or after the current location.

User device 100 stores one or more items of media content (e.g., an audiobook) in a data store. For example, user device 100 may include one or more hard disk drives, solid state memories, and/or any other type of non-transitory computer readable storage medium accessible to or integrated within user device 100. Media content items may be retrieved from storage and conveyed to the user as audible output.

A media content item may, for example, be stored in memory by being downloaded from a content server system. In certain implementations, an entire media content item does not have to be downloaded before audio playback is begun on user device 100.

Selection of a media content item may be performed through display device 110. For example, a web browser may be presented to the user, and by activating control icons presented on the display device, a user may select a media content item of interest to be sent to user device 100.

Once all or a portion of a media content item has been downloaded to user device 100, playback of the media content item may be started (e.g., by pressing play button 132). In the illustrated implementation, playback of the second chapter of *Pride and Prejudice* has proceeded to the 18 minute and 8 second point, as indicated in specific location reference 124.

The audio output during playback is typically generated as a number of user perceptible sounds that occur one after the other. For example, the audio output for a book generally follows the printed text in the book (e.g., word by word). The user device may generate a stream of signals (e.g., electrical or optical) that represent the audio output during playback. In some modes, the use device may then actually generate the audible sounds from the audio output stream (e.g., through speaker 140) or send the audio output stream to a remote transducer. The signals could, for example, be output through audio output jack 150, from which they could be conveyed to speakers (e.g., earphone or headphones) that actually produce the audible sounds.

At practically any point during the playback of the media content, a user may choose to adjust the playback position of the audio output stream. For example, at the current location, a user may select fixed jump back button 134a and jump back 30 seconds in the audio output stream or select fixed jump forward button 134b and jump forward 30 seconds in the audio output stream. Additionally, a user may select smart jump back button 136a, and user device 100 may select a location to the audio output stream to which to jump back in the audio output stream. A user may also select smart jump forward button 136b, and user device 100 may select a location to which to jump forward in the audio output stream.

To make an intelligent decision regarding where to move back or move forward, user interface device 100 may evaluate a variety of location information. For example, a number of locations of interest may be analyzed. The different locations of interest for an item of media content are generally referred to as locations, and the locations are designated by location indicators for the media content item.

In general, a variety of location indicators and associated location types may be associated with the media content. The location indicators and associated location types may, among other things, be generated by the user of user device 100, by analyzing the structure of the underlying text (e.g. book), by analyzing the text itself, and/or by others listening to the media content or reading text versions of the media content (e.g., on similar user devices). These location indicators and location types may be stored as metadata regarding the media content item.

For example, as a user is listening to audible output of media content, she may place bookmarks at certain locations and/or highlight certain passages (e.g., if accompanying text is being displayed). The bookmarks and/or highlights may be entered through user input devices of user device 100. For instance, a user may select bookmark button 138 whenever she wants to mark a location in the audio output stream of the media content item to which she is listening. User bookmarks and highlighted passages provide indications of locations to which user may be interested in returning. A user may also enter bookmarks and highlight passages by audible commands.

As another example, an analysis of the underlying book itself may locate natural breaks in the underlying text (e.g., chapter breaks, section breaks, etc.). Chapter breaks may, for example, also be manifest in the media content (e.g., as different sections of a media content item). This analysis may also be obtained and/or supplemented by analyzing the text. Analyzing the book structure may be performed by the user device and/or a remote content server system, which may send the data to user device 100.

In certain implementations, the underlying text of the book may be analyzed to determine locations of interest. For example, by using a concordance program, main characters, important places, and rising action sequences in texts may be determined. These may be key points of interest for a user to find in a book (whether in text or audio format). Techniques that may be used to build a concordance include natural language processing, computational linguistics, and/or n-grams. An example concordance program is X-ray from Amazon.com of Seattle, Wash. (USA). Analyzing the underlying text may be performed by the user device and/or a remote content server system, which may send the data to user device 100.

In some implementations, locations of interest may be determined by users of other user devices that are listening to the same media content or reading text versions of the same media content. For example, other users may bookmark certain locations and/or highlight certain passages. The locations identified by other users may be sent to a server system and passed to the user device. For instance, in a system in which a content server system makes media content available on different devices of a user (e.g., an electronic reader, a smart phone, and a laptop), the content server system may receive location information from each type of device when a user designates a media content location (e.g., to ensure consistency between devices). Designations of locations in the media content from various users at the content server system may be aggregated together (e.g., in a non-user-identifying manner) to determine a number of locations of interest for the media content.

The different locations of interest in an item of media content are designated by location indicators. In general, location indicators designate locations (e.g., times, positions, etc.) in the audio output stream for a piece of media content. A location indicator may, for example, be a timestamp for the audio output stream, with the timestamp's time indicating the location in the audio output stream. For instance, a time may be one minute thirty seconds, which may be stored as a variable and/or in some other data format by user device 100. A location indicator may be tracked to the millisecond, microsecond, or some other time unit. (The location indicators discussed herein are to the nearest second as a matter of convenience for the illustrated examples.) A location indicator could also, for example, be a pointer associated with a position in the audio output stream. The pointer could, for example, designate a portion of the media content (e.g., audio file portion or associated text portion) for the audio output stream being generated. The portions of a piece of media content may be stored in memory in various orders (e.g., sequential, non-sequential, etc.), but generally have a sequence that may be used to generate the audio output stream. Text data may be associated with a location in an audio output stream base on a synchronization and/or mapping file stored in the user device. In some implementations, a mapping file may include time units that correspond to each word of the text data. In some implementations, a location indicator may be determined by an index and/or word position. For example, a current word position may be word 100 out of 123,880 words of a book. Similar to the implementations where a location indicator may be designated by time, a location indicator by index or word position may be stored in a variable. Each location may have a location indicator (e.g., a timestamp in the audiobook) and a location type (e.g., chapter break, section break, user bookmark, etc.).

Location indicators and location types may be stored as data associated with the media content (i.e., metadata). The metadata may actually be stored with the media content or as affiliated data.

Using the metadata regarding locations, an intelligent decision may be made regarding where to restart the audio output stream. For example, in certain implementations, a prioritized scheme of location types may be analyzed by the user device. Thus, if a high priority location (e.g., a user bookmark) and a low priority location (e.g., a main character is introduced) are near the current location in the audio output stream, the high priority location may be selected.

An example priority scheme for location types is shown below:

| Priority | Location Type |
| --- | --- |
| 1 | User Bookmark |
| 2 | User Highlight |
| 3 | Third Party Highlight |
| 4 | Third Party Bookmark |
| 5 | Main Character Introduced |
| 6 | Rising Action |
| 7 | Chapter Start |
| 8 | Section Break |
| 9 | Paragraph Start |

Other location types are possible, and location types may be arranged into a number of priority schemes. Moreover, the user may personalize the priority scheme through user preferences, and user device 100 may learn preferred location types, as discussed below.

In certain implementations, the location indicator may also be analyzed in selecting a location in the audio output stream. For example, if a higher priority location type (e.g., chapter beginning) is far from the current location (e.g., fifteen minutes) and a medium priority location type (e.g., main character introduction) is close to the current location (e.g., five minutes), the location indicator associated with the medium priority location type may be chosen. A lower priority location type (e.g., paragraph start) may, for instance, be chosen if higher and medium priority location types are distant from the current location.

Thus, the proximity of a location may modify a priority scheme for location types. The proximity of a location may modify the priority scheme for location types by various techniques. For example, in particular implementations, the proximity may be used as a truncating function (e.g., if location is too far from current location, disregard location regardless of type). In some implementations, the proximity may be used in a weighted manner with the priority (e.g., priority times proximity) to determine the preferred location. The proximity of a location may be emphasized differently when jumping forward than when jumping backward.

Figure 2:
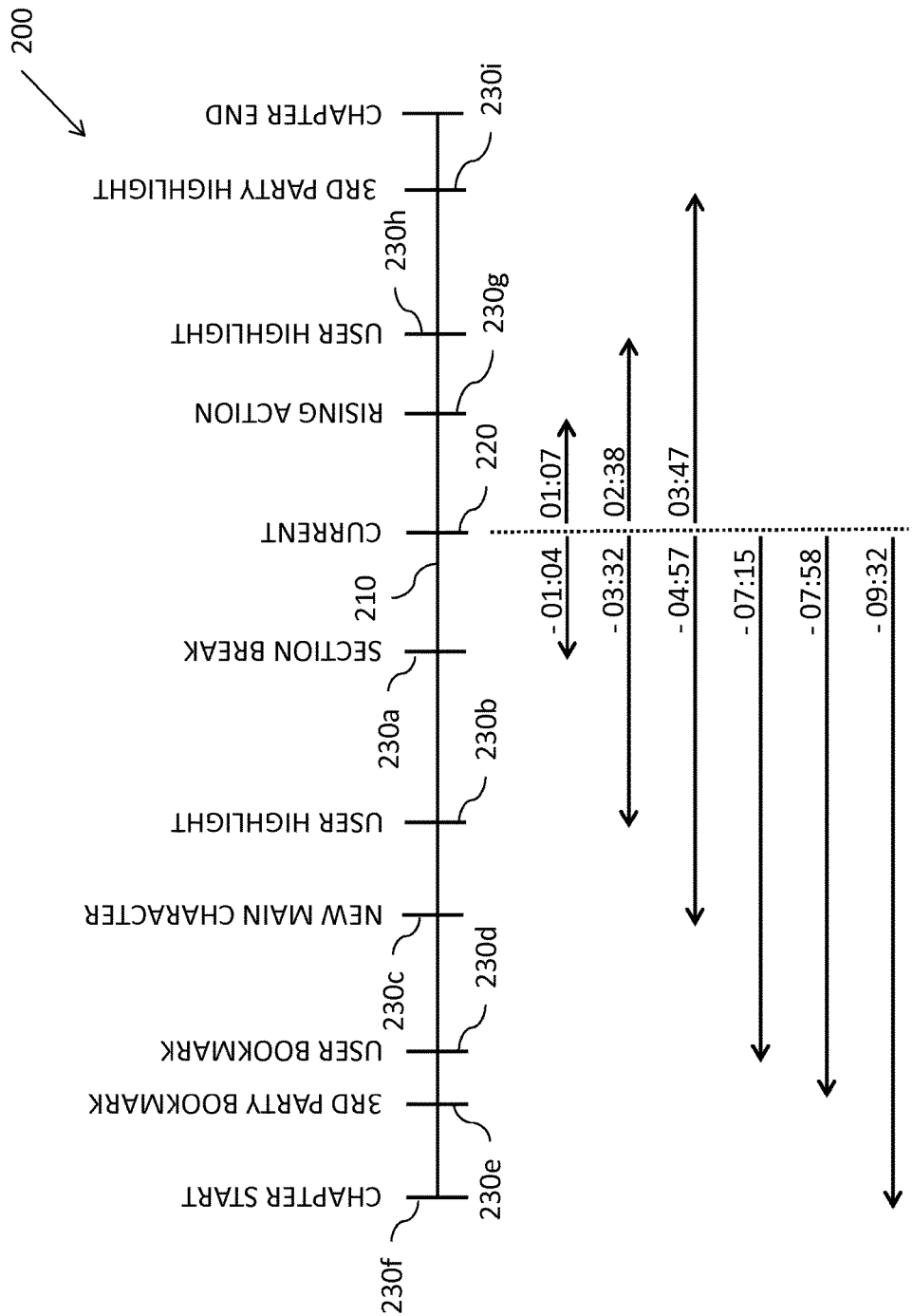
FIG. 2 is a timeline illustrating an example association of location indicators and location types for managing media content playback.

FIG. 2 illustrates an example association 200 between location indicators and location types for managing media content playback. Association 200 includes a timeline 210 that illustrates the chronological relationship of various components in a portion of media content (e.g., a chapter of a book). For instance, timeline 210 shows the beginning of the chapter and the end of the chapter and indicates a current playback location 220 in the chapter. Timeline 210 also shows location options 230 in the chapter. For example, location option 230a is a section break that is located 1 minute and 4 seconds prior to current location 220. As another example, location option 230c is a new main character introduction in the story that is located 4 minutes and 57 seconds prior to current location 220. As an additional example, location option to 230d is a user bookmark that is located 7 minutes and 15 seconds prior to current location 220.

Some of location options 230 are after the current location. For example, location option 230g is a rising action sequence in the story that is located 1 minute and 7 seconds ahead of current location 220. As another example, location option 230h is a user highlight that is located 2 minutes and 38 seconds ahead of current location 220. The location options that occur after current location 220 may be used when a user indicates the desire to jump forward from the current location.

Using the priority scheme outlined above for a backward jump, user bookmark 230d would be selected. The audio output stream may then begin at this location.

But for the example illustrated in FIG. 2, user bookmark 230d is 7 minutes and 15 seconds prior to current location 220. This may be too far from the current location to make user bookmark 230d a reasonable place to resume audio playback. Thus, lower priority indicator types may be selected. For example, in some implementations, it may be preferred not to move more than a set time range away from the current location (e.g., five minutes). For the example illustrated in FIG. 2, this would mean that user highlight 230b, located 3 minutes and 32 seconds prior to current location 220, would be selected. The time range within which to analyze location types may be adjusted by the user or user device 100, as explained in more detail below.

In certain implementations, it is possible to jump backwards beyond the start of a chapter. For example, a chapter start could be treated just as another location for the audio output stream. Thus, if a higher priority location was before the chapter start (and within range of any proximity qualifiers), the higher priority location could be selected even though it is on the other side of the chapter start from the current location. As an additional example, in situations where the chapter start has a high priority, it may be possible to jump back past the chapter start when the current location in the media content is (or is every near to) the chapter start.

In certain implementations, the user device may also consider the context around the current location in selecting a location. For example, if the associated text is discussing a character, the introduction of that character may be moved up in priority for a jump from that location (e.g., from 5 to 3 in the table above).

After selecting a location, user device 100 may begin generating the audio output stream from the associated location indicator. The audio output stream may continue to be generated until another one of control icons 130 is activated or until the end of the chapter is reached.

If the user does not like the location that user device 100 selected (e.g., it is not far enough back or is too far back), the user may adjust the location by smart jump buttons 136 (or fixed jump buttons 134). In certain implementations, through a user's repeated use of smart jump buttons 136 to try to find an appropriate location, user device 100 may attempt to learn the location types to which the user likes to jump and/or preferred jump times (e.g., through machine-learning techniques). If one or more types of preferred location indicators types and/or location indicators can be determined, user device 100 may adjust the priority scheme to better match the preferences of the user. If a preferred jump time can be determined, user device 100 may adjust the window within which it analyzes location types.

In certain implementations, user device 100 may also try to make an intelligent decision regarding where to start generating the audio output stream near the selected location indicator. For example, the underlying text (e.g., words and punctuation) associated with a time range around the selected location identifier may be analyzed to determine a preferred starting location. Examples of preferred starting locations include grammatical breaks (e.g., the beginning of a paragraph or a sentence). The text may, for example, be analyzed before the audible playback of the media content has begun (e.g., analyzed and sent from a remote content server system) or in real time with the location indicator selection (e.g., by the user device or a remote content server system).

Analyzing the associated text surrounding the selected location indicator may, for example, be accomplished by determining text data representing words near the selected playback position in the audio output stream. User device 100 may, for example, retrieve text data representing words and punctuation within the audio content being output. For instance, the text data associated with an audiobook may be retrieved from a synchronization and/or mapping file stored in the user device. In some implementations, a mapping file may include time units that correspond to each word of the text data. User device 100 may use a configurable window to retrieve the words surrounding the text corresponding to the selected location indicator. In some implementations, the configurable window may be associated with the time distance between the current playback location and the selected location indicator. This may, for example, be expressed as a percentage (e.g., 10%). For instance, if the selected location indicator is 500 seconds from the current playback location, an appropriate starting point may be searched for within 50 seconds of the selected location indicator. The user device may examine the underlying text for appropriate starting locations (e.g., paragraph beginnings or sentence beginnings) within the window of the selected location indicator (e.g., 50 seconds before to 50 seconds after the selected location indicator).

In some implementations, the intelligent selection of locations may be used in conjunction with fixed jump back buttons. For example, if a user selects a fixed jump back button (e.g., 30 s), the user device may examine the underlying text region around text corresponding the jump back location for locations of interest (e.g., bookmarks, highlights, character introduction, etc.). If one of these can be found close to the fixed jump back location, the location of interest may be used as the restart point rather than the fixed location (e.g., 30 s). If multiple locations of interest are found in the region, selection of an appropriate location may be accomplished as discussed previously.

Additionally, jumping back a fixed time in the audio output stream may cause the audio playback to restart at a location that is difficult for the user to interpret (e.g., in the middle of a sentence or word). Thus, the user device may also examine the underlying text around the text corresponding to the fixed jump back location to select an appropriate starting location (e.g., beginning of a sentence or a paragraph), as discussed previously.

User device 100 provides a variety of features. For example, user device 100 allows a user to intelligently jump to preferred locations in media content. When listening to audio content especially, a user may often become distracted (e.g., while driving). And trying to rewind to a location at which the user remembers in the audio output stream can often be quite cumbersome (e.g., with a number of overshoots and undershoots). User device 100, however, allows a user to quickly find one or more potentially interesting locations, at which they may be able to reengage with the media content in a meaningful manner. The locations of interest may be designated by a user of user device 100 (on user device 100 or another user device) or be generated based on the media content itself or feedback from other consumers of the media content.

Additionally, user device 100 may avoid restarting playback at confusing points (e.g., in the middle of a word or sentence). When reading a text, it is easy to flip back a few pages and start reading at the beginning of a paragraph. However, audio content is a primarily time driven output. Thus, moving back to a specific point allows audio output to begin at unpredictable locations (e.g., in the middle of a word). User device 100 may, however, allow output to begin at more recognizable points (e.g., the beginning of a paragraph or sentence).

Although FIG. 1 illustrates an example user device 100, other user devices for managing media content playback may include fewer, additional, and/or a different arrangement of components. For example, a user device may not include fixed jump back buttons 134 or bookmark button 138. As another example, a user device may not include smart jump back buttons (e.g., if the smart feature is used in conjunction with fixed jump back buttons). As an additional example, a user device may include a highlight button (e.g., if the accompanying text is being displayed). As a further example, a user device may not include speaker 140 or audio output jack 150. As another example, a user device may include a undo button, which allows a previous action (e.g., jumping back) to be reversed (e.g., to return the audio playback to the location before the jump back.) User interface 120 may also be generally rearranged in a variety of manners.

In certain implementations, a user may be allowed to choose the location to which they want to jump. The location options may be presented in a variety of formats (e.g., textual or audible). For example, the location options could be presented in a list ordered based on proximity to the current location in the media content. As another example, the location options could be presented in a manner that graphically illustrates the locations of the location indicators. For instance, the location options in FIG. 2 could be presented to the user (e.g., in a user interface), and the user could select one of them. In some implementations, a user may enter notes regarding a bookmark, and these could be presented along with the bookmarked locations. The audio output stream could then begin at the associated location identifier.

In some implementations, the user may be presented with a limited number of location options (e.g., 2-4). To limit the number of location options, a priority scheme (e.g., similar to that discussed above) may be applied to the available locations. By presenting the user with location options and receiving a choice from a user, the user may receive audio content that they desire. Additionally, presenting a user with location options may assist user device 100 in learning which locations a user prefers.

Figure 3:
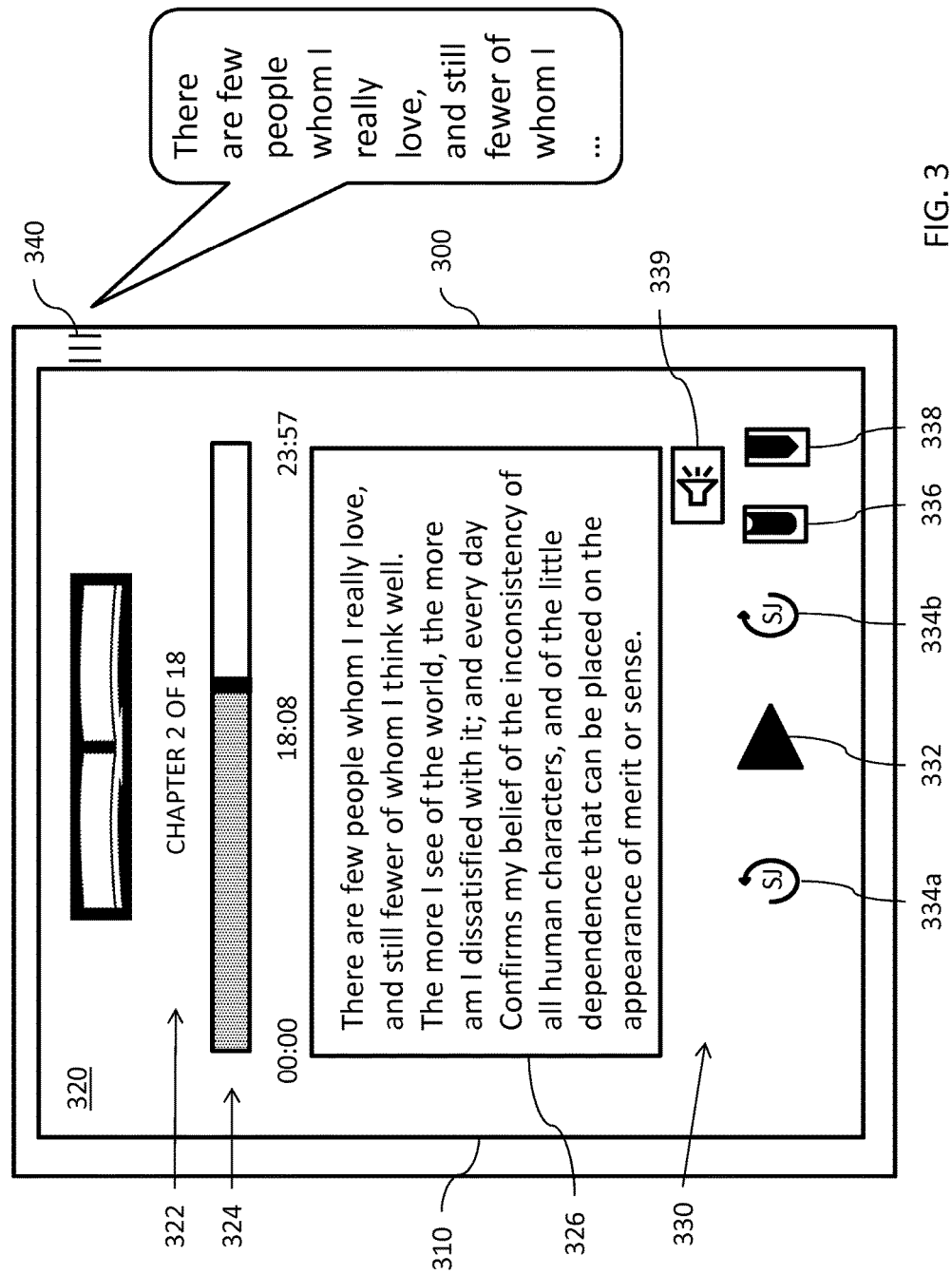
FIG. 3 is a line drawing illustrating another example user device for managing media content playback.

FIG. 3 illustrates another example user device 300 for managing media content playback. In the illustrated example, user device 300 is managing audible playback of media content, but in other implementations user device 300 may manage other types of playback (e.g., video) of media content. Similar to user device 100, user device 300 may generally be any computing device capable of receiving data and presenting it to a user.

In the current example, user device 300 is outputting audio content associated with a book. In other implementations, user device 300 may output audio content associated with other textual items (e.g., magazine articles, screen plays, scholarly papers, patents, or any other textual source). Additionally, user device 300 may output audio content that is not associated with an underlying textual item. For example, the media content may just be audio content (e.g., from a speech) or include audio content as a component (e.g., video).

User device 300 includes a display 310 that presents a user interface 320 during playback of media content. User device 300 audibly presents media content via one or more speakers 340.

User interface 320 may be generated in part by the user device 300 and/or a remote content server system, examples of which is described in further detail below. User interface 320 includes, among other things, a general location reference 312 (designating the current chapter in this example) and a specific location reference 324 (indicating the total time of the current chapter and the current time location within the chapter in this example).

User interface 320 also includes a portion 326 presenting visual information associated with the book. In the current implementation, the visual information corresponds to the audio output stream currently being generated. For example, user device 300 may be provided with content synchronization information that maps one or more words in the associated textual content with a position of an identical word or words in the audio output stream (e.g., the identical word or words that are spoken, sung, recited, etc. in the item of audio content). In some implementations, the synchronization information may indicate time positions and/or data locations within associated audio content that correspond to word, paragraph, chapter, section, or other positions within the textual content. For example, chapters of an ebook may be associated with start and/or end times of a chapter in the audiobook. More information regarding synchronizing an item of audio content with an item of associated textual content, as well as content synchronization information that may be stored in association with the synchronization, may be found in U.S. patent application Ser. No. 12/273,473 ("the '473 Application"), filed Nov. 18, 2008, entitled "SYNCHRONIZATION OF DIGITAL CONTENT," which is hereby incorporated by reference in its entirety. An example of associated content, as used herein, may include various representations of content discussed in the '473 Application. Furthermore, the associated textual content may be further synchronized and/or associated with metadata content, which is described in further detail below.

At the bottom, user interface 320 presents icons 330 for a number of user control functions. In this implementation, user device 300 includes a touch sensitive layer (not shown) to detect user interaction with the icons. Icons 330 include a play button 332, a smart jump back button 334a, a smart jump forward button 134b, a bookmark button 136, a highlight button 338, and a mute button 339. In other implementations, icons 330 may be replaced by physical devices (e.g., buttons, slider bars, etc.).

User device 300 stores one or more items of media content in a data store (e.g., a hard disk drive, a solid state memory, and/or any other type of non-transitory computer readable storage medium accessible to or integrated within user device 100). Media content items may be retrieved from storage and conveyed to the user as audible output.

A media content item may, for example, be stored in memory by being downloaded from a content server system. In certain implementations, an entire media content item does not have to be downloaded before audio playback is begun on user device 300.

Selection of a media content item may be performed through display device 310. For example, a web browser may be presented to the user and by activating control icons presented on the display device, a user may select a media content item of interest to be downloaded to user device 300.

Once all or a portion of a media content item has been downloaded to user device 300, playback of the media content item may be started (e.g., by selecting play button 332). In the illustrated implementation, playback of the second chapter of *Pride and Prejudice* has proceeded to the 18 minute and 8 second point, as indicated in specific location reference 324.

At practically any point during the playback of the media content, a user may choose to adjust the playback location for the media content. For example, at the current location, a user may select smart jump back button 334a, and user device 300 may select a location to which to jump back in the audio output stream for the media content. A user may also select smart jump forward button 334b, and user device 300 may select a location to which to jump forward in the audio output stream.

To make an intelligent decision regarding where to jump back to or jump forward to, user interface device 300 may evaluate a number of location indicators and associated location types for the media content, as discussed above. In general, a variety of location indicators and associated location types may be associated with the media content. The location indicators and associated location types may, among other things, be generated by the user of user device 300, by analyzing the structure of the underlying text (e.g. book), by analyzing the text itself, and/or by others listening to the media content or reading the text associated with the media content (e.g., on similar user devices). These location indicators and location types may be stored as metadata regarding the media content.

As two examples of location indicators and location types, as a user is listening to audible output of media content, she may place bookmarks at certain points and/or highlight certain passages of accompanying text being displayed. The bookmarks may be activated by selecting bookmark button 338, and highlight button may allow highlighting of text presented in user interface 320. A user may select bookmark button 338 whenever she wants to designate a location in the media content to which she is listening. A bookmark is typically associated with a specific location in the audio output stream (e.g., to the nearest second or less), as opposed to a traditional physical bookmark in a book. A user may also highlight text whenever she would like by selecting highlight button 338. Activation of the highlighting button may highlight the text on the screen or allow the user to specify which presented text to highlight (e.g., by touching the text in user interface 320). The highlighted text may be mapped to a location indicator for the audio output stream. User bookmarks and highlighted passages provide indications of locations to which user may be interested in returning.

Location indicators and location types may be stored as data associated with the media content (i.e., metadata). The metadata may actually be stored with the media content or as affiliated data.

Using the metadata regarding locations, an intelligent decision may be made regarding where to restart the audio output stream. For example, in certain implementations, a priority scheme of location indicator types may be analyzed by the user device. Thus, if a high priority location (e.g., a user bookmark) and a low priority location (e.g., a main character is introduced) are near the current place in the audio content, the high priority location may be selected.

In certain implementations, the location indicator may also be analyzed in selecting a location in the media content. For example, if a higher priority location type (e.g., chapter beginning) is far from the current location (e.g., fifteen minutes) and a medium priority location type (e.g., main character introduction) is close to the current location (e.g., five minutes), the location indicator associated with the medium priority location type may be chosen. A lower priority location type (e.g., paragraph start) may, for instance, be chosen if higher and medium priority location types are distant from the current location.

If user does not like the location that the user device selected (e.g., it is not far enough back or is too far back), the user may adjust the location by smart jump buttons 334.

In certain implementations, through a user's repeated use of smart jump buttons 334 to try to find an appropriate location, user device 300 may attempt to learn the location types to which the user likes to jump and/or preferred jump distances (e.g., through machine-learning techniques). If one or more types of preferred location indicators can be identified, user device 300 may adjust its priority scheme to better match the preferences of the user. If a preferred jump distance can be determined, user device 300 may adjust its window within which it analyzes location types.

After selecting a location indicator, user device 300 may begin generating the audio output stream from the location indicator. The audio output stream may continue to be produced until another one of control icons 330 is activated or until the end of the chapter is reached.

In certain implementations, user device 300 may try to make an intelligent decision regarding where to start generating audio content near the selected location indicator. For example, the text (e.g., works and punctuation) surrounding the text associated with a selected location indicator may be analyzed to determine a preferred starting point. Examples of preferred starting points include the beginning of a paragraph or sentence. The text may, for example, be analyzed before the playback of the media content has begun (e.g., analyzed and sent from a remote content server system) or in real time with the location indicator selection (e.g., by the user device or a remote content server system).

User device 300 provides a variety of features. For example, user device 300 allows a user to intelligently move to preferred locations in media content. When listening to audio content especially, a user may often become distracted (e.g., while driving). Trying to rewind to a point at which the user remembers in an audio output stream can often be quite cumbersome (e.g., with a number of overshoots and undershoots). User device 300, however, allows a user to quickly find one or more potentially interesting locations in the audio output stream, at which they may be able to reengage with the media content in a meaningful manner.

Additionally, user device 300 may avoid restarting playback at confusing locations (e.g., in the middle of a word or sentence). When reading a text, it is easy to flip back a few pages and start reading at the beginning of a paragraph. However, audio content is a primarily time driven output. Thus, moving back to a specific location allows audio output to begin at unpredictable locations (e.g., in the middle of a word). User device 300 may, however, allow output to begin at more recognizable locations (e.g., the beginning of a paragraph or sentence).

Figure 4:
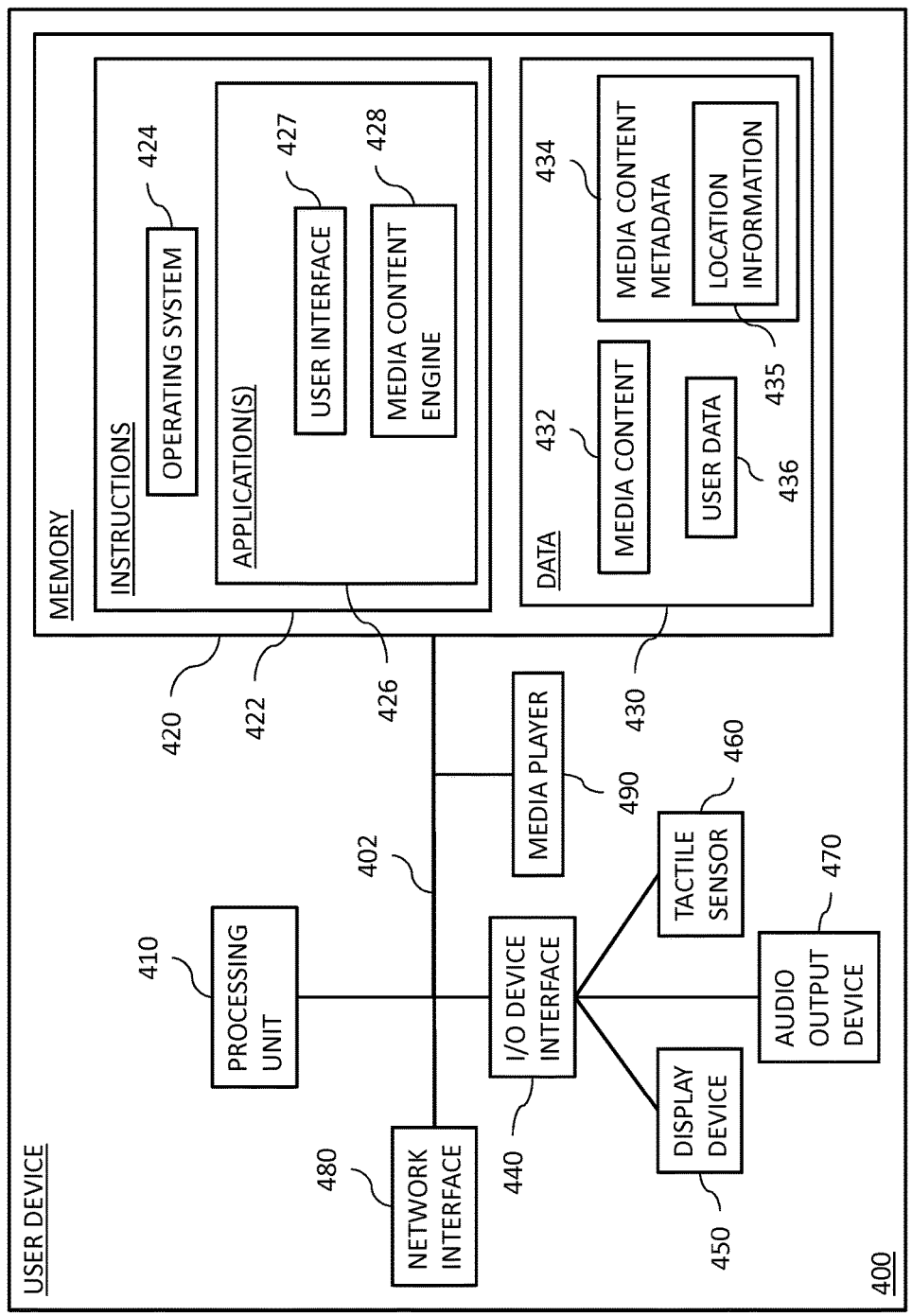
FIG. 4 is a schematic block diagram illustrating an additional example user device for managing media content playback.

FIG. 4 illustrates an example user device 400 for managing media content playback. User device 400 may generally be capable of receiving and presenting media content to a user of the device. For example, user device 400 may be capable of receiving audio content and generating audio output by directing audible output through speakers, headphones, or the like. Additionally, user device 400 may output audio content that is not associated with an underlying textual item. For example, the media content may just be audio content (e.g., from a speech).

User device 400 may generally be any computing device capable of receiving data and presenting it to a user. User device 400 may, for example, be a laptop, a tablet computer, a personal computer, a personal digital assistants (PDA), a hybrid PDA/mobile phone, a smartphone, a wearable computing device, a global positioning system (GPS) device, an electronic book reader, a set-top or other television box, a camera, an audiobook player, a digital media player, a video game console, an in-store kiosk, a television, an electronic device for inclusion in vehicles or machinery, a gaming device, or the like.

User device 400 includes a processing unit 410, memory 420, an input/output device interface 440, a network interface 480, and a media player 490, all of which may communicate with one another by way of a communication network 402. Coupled to input/output device interface are a display device 450, a tactile sensor 460, and an audio output device 470.

Processing unit 410 may include one or more processors (e.g., one or more microprocessors). The processors could, for instance, operate according to reduced instruction set computer (RISC) or complex instruction set computer (CISC) principles. In general, processing unit 410 may be any device that manipulates information in a logical manner.

Memory 420 may, for example, include random access memory (RAM), read-only memory (ROM), disc memory, and/or other persistent or non-transitory computer-readable storage media. Various items may be stored in different portions of memory 420 at various times (e.g., on a disc and in RAM). Memory 420, in general, may be any combination of devices for storing information.

Memory 420 includes instructions 422 and data 430. Instructions 422 include an operating system 424 (e.g., Windows, Linux, or Unix), which provides general administration and operation of user device 400, and one of more applications 426 that processing unit 410 executes in order to generate audio from media content and manage its playback. Applications 426 include a user interface module 427, which facilitates generation of user interfaces (such as by providing instructions therefor) for visual presentation, and a media content engine 428, which is responsible for managing the media content being output to a user of user device 400. A user interface may, for example, be displayed via a browser implemented by user device 400. Data 430 includes the data required for and generated by applications 426. For instance, data 430 may store media content 432 (e.g., an audiobook), media content metadata 434 (e.g., location information 435), and user data 436 (e.g., user preferences).

Input/output device interface 440 may, for example, include one or more communication interfaces to communicate with one or more user interface devices. A communication interface may, for instance, be a network interface card (whether wireless or wireless), a bus (e.g., parallel or serial), a graphics card, or any other device for interfacing with a user interface device.

User device 400 includes three user interface devices—display device 450, tactile sensor 460, and audio output device 470. Display device 450 may be a monitor, a liquid crystal display, a light-emitting diode display, a projector, or any other device for visually presenting data. Tactile sensor 460 could be a touchscreen, one or more buttons, a keypad, or any other device for physically detecting user input. Audio output device 470 may be a sound transducer (e.g., a speaker), an audio output jack, or any other device for conveying audio information to a user.

In certain implementations, user device 400 could include two or more user input devices (e.g., a keyboard, a keypad, a touchpad, a mouse, a stylus, or a microphone). In general, user device 400 may include any combination of devices by which a computer system can receive information from and output information to a user.

Network interface 480 may provide connectivity to one or more networks (e.g., the Internet) or computing systems (e.g., a content server system). Network interface 480 may, for example, be a network interface card (whether wireline or wireless), a modem, or any other device for sending and receiving data.

Media player 490 is responsible for converting media content to an audio format. For example, media player 490 may decompress audio data according to a given audio file format or streaming media audio format. Audio data may be compressed to save bandwidth during transmission and storage. Decompression allows the original digital data (or at least a close approximation therefor) to be reconstructed.

Media player 490 may include one or more decoders for converting audio data, which may or may not be stored in a sequential manner that corresponds to the audio to be output therefrom, into a stream of signals (e.g., electrical or optical) that represent the appropriate audio output. In some modes, the use device may then actually generate the audible sounds from the audio output stream (e.g., through a speaker) or send the audio output stream to a remote transducer (e.g., through an output jack), at which the signals could be converted to audible sounds.

Network system 402 is responsible for communicating information between processing unit 410, memory 420, input/output device interface 440, and network interface 480. Network system 402 may, for example, include a number of different types of busses (e.g., serial and parallel).

In operation, user device 400 may receive information and instructions from other computing systems (e.g., a remote content server system) through network interface 480. For example, a media content item (e.g., an audiobook) may be received and stored in media content store 432. Media content for user device 400 may, for example, be selected by a user through a web browser or specialized user interface. Media content store 432 may store one or more media content items. Note that an entire media content item does not have to be received before playback can begin. For instance, a portion of the media content item may be received, the playback may be started, and the rest of the media content item may be received while the rest of the media content is delivered.

When a user desires to listen to a media content item, media player 490, under the management of media content engine 428, may communicate to and from memory 420 and provide a user interface on display device 450 for the user to select the appropriate media content item and control its playback. User selection may, for example, be received through tactile sensor 460.

User device 400 may generate a variety of user interfaces to present on display device 450 by using user interface module 427. These user interfaces may present icons for user interaction with user device 400. The user interactions may be detected by tactile sensor 460, which may be an overlay on display device 450. In some implementations, user interfaces may include web-browsers, which may be configured by a remote content server system.

User interfaces typically include visual information associated with a media content items (e.g., a book). In some implementations, during playback the visual information corresponds to the audio content being generated. For example, a user device may be provided with content synchronization information that maps one or more words in the item of associated textual content with a position of an identical word or words in the item of audio content (e.g., the identical word or words that are spoken, sung, recited, etc. in the item of audio content). In some implementations, the synchronization information may indicate time positions and/or data locations within associated media content that correspond to word, paragraph, chapter, section, or other positions within the textual content. For example, chapters of an ebook may be associated with start and/or end times of a chapter in the audiobook.

Once audio playback has begun, media player 490, according to media content engine 428, may begin generating an audio output stream. At practically any point during the audio playback of the media content, a user may choose to adjust the playback location of the audio output stream. For example, a user may select a smart jump back button through tactile sensor 460, and user device 400 may select a location to which to move back in the audio output stream. A user may also select smart jump forward button, and user device 400 may select a location to which to move forward in the audio output stream.

To make an intelligent decision regarding where to move back to or move forward to, media content engine 428 may evaluate a number of location indicators and associated location types for the media content, as discussed above. The location indicators and location types may be stored as media content metadata 434. Metadata 434 may be downloaded from a remote content server system and/or generated on user device 400, as discussed below.

In general, a variety of location indicators and associated location types may be associated with a media content item. The location indicators and associated location types may, among other things, be generated by the user of user device 400, by analyzing the structure of the underlying text (e.g. book), by analyzing the text itself, and/or by others listening to the media content or reading text associated with the media content (e.g., on similar user devices). These location indicators and location types may be stored as metadata regarding the media content.

As two examples of location indicators and location types, as a user is listening to audible output of media content, she may place bookmarks at certain locations and/or highlight certain passages of accompanying text being displayed. The bookmarks and/or highlights may, for example, be activated through a bookmark button and a highlight button (e.g., through tactile sensor 460). A user may designate a bookmark whenever she wants to mark a location in the audio output stream to which she is listening. A bookmark is typically associated with a specific location in the media content, as opposed to a traditional physical bookmark in a book. A user may also highlight text whenever she would like. The location of the highlighted text may be mapped to a location for the audio output stream. User bookmarks and highlighted passages provide indications of locations to which the user may be interested in returning.

User bookmarks and/or user highlights may be downloaded from a remote server system and/or received at user device 400. The bookmarks and highlights may be downloaded from the server system and stored in metadata store 434, for example, if they have been previously designated by a user (either on user device 400 or another user device) for the media content item. The bookmarks and highlights may also be received at user device 400 as a user listens to the media content item and stored in metadata store 434.

Using the metadata regarding locations, processing unit 410 may make an intelligent decision regarding where to restart the output of the audio output stream. For example, in certain implementations, a priority scheme for location types may be analyzed by the processing unit. Thus, if a high priority location (e.g., a user bookmark) and a low priority location (e.g., a main character is introduced) are near the current location in the audio content, the high priority location may be selected.

In certain implementations, the location indicator may also be analyzed in selecting a location in the media content. For example, if a higher priority location type (e.g., chapter beginning) is far from the current location in the audio output stream (e.g., fifteen minutes) and a medium priority location type (e.g., main character introduction) is close to the current location (e.g., five minutes), the location indicator associated with the medium priority location type may be chosen. A lower priority location type (e.g., paragraph start) may, for instance, be chosen if higher and medium priority location types are distant from the current location.

Thus, the proximity of a location may modify a priority scheme for location types. The proximity of a location may modify the priority scheme for location types by various techniques. For example, in particular implementations, the proximity may be used as a truncating function (e.g., if location is too far from current location, disregard location). In some implementations, the proximity may be used in a weighted manner with the priority (e.g., priority times proximity) to determine the preferred location. The proximity of a location may be emphasized differently when jumping forward than when jumping backward.

If the user does not like the location that the user device selected (e.g., it is not far back enough or too far back), the user may adjust the location. In certain implementations, through a user's attempts to try to find an appropriate location, media content engine 428 may attempt to learn the location types to which the user likes to jump and/or preferred jump distances (e.g., through machine-learning techniques). If one or more types of preferred location indicators can be identified, user device 400 may adjust its priority scheme to better match the preferences of the user, which can be stored in user data store 436. If a preferred jump time can be determined, media player 438 may adjust its window within which it analyzes location indicators, which can also be stored in user data store 436.

After selecting a location indicator, user device 400 may beginning generating the audio output stream from the location. The audio output stream may continue to be produced until another input is received through tactile sensor 460 (e.g., bookmark, highlight, jump back, jump forward, stop, etc.) or until the end of the media content item or a portion thereof (e.g., a chapter) is reached.

In certain implementations, media content engine 428 may try to make an intelligent decision regarding where to start generating the audio output stream in a time range around the selected location indicator. For example, the text (e.g., works and punctuation) surrounding the text associated with selected location identifier may be analyzed to determine a preferred starting point. Examples of preferred starting points include the beginning of a paragraph or sentence. The text may, for example, be analyzed before the playback of the media content has begun (e.g., analyzed and sent from a remote content server system) or in real time with the location indicator selection (e.g., by the user device or a remote content server system).

In some implementations, the intelligent selection of locations may be used in conjunction with fixed jump back buttons. For example, if a user selects a fixed jump back button (e.g., 30 s), the user device may examine the text region around the jump back point for locations of interest (e.g., bookmarks, highlights, character introduction, etc.). If one of these locations can be found close to the fixed jump back location, the location of interest may be used as the restart point rather than the fixed location (e.g., 30 s). If multiple locations of interest are found in the region, selection of an appropriate location may be accomplished as discussed previously.

Additionally, jumping back a fixed time in media content may cause the audio output stream to restart at a point that is difficult for the user to interpret (e.g., in the middle of a sentence or word). Thus, media content engine 428 may also examine the text around the text associated with the fixed jump back location to select an appropriate starting point (e.g., beginning of a sentence or a paragraph), as discussed previously.

User device 400 provides a variety of features. For example, user device 400 allows a user to intelligently move to preferred locations in media content. When listening to audio content especially, a user may often become distracted. Moreover, trying to rewind to a location which the user remembers in an audio output stream can often be quite cumbersome (e.g., with a number of overshoots and undershoots). User device 400, however, allows a user to quickly find one or more potentially interesting locations, at which they may be able to reengage with the media content in a meaningful manner.

Although FIG. 4 illustrates an example user device 400, other user devices for managing media content playback may include fewer, additional, and/or a different arraignment of components. For example, a user device may include a fixed number of tactile devices (e.g., buttons) for receive user input. Additional user input devices could include a keyboard, a mouse, a touchpad, a microphone, a trackball, a microphone, image recognition through an input camera (e.g., eye, hand, head, body tracking and/or placement), a gamepad, an accelerometer, a gyroscope, or other device for receiving input from a user. As another example, the media content metadata may be part of the media content. As a further example, a user device could include an antenna to assist in wireless operations. As another example, a user device code include a decoder for converting the media content into analog signals.

Figure 5:
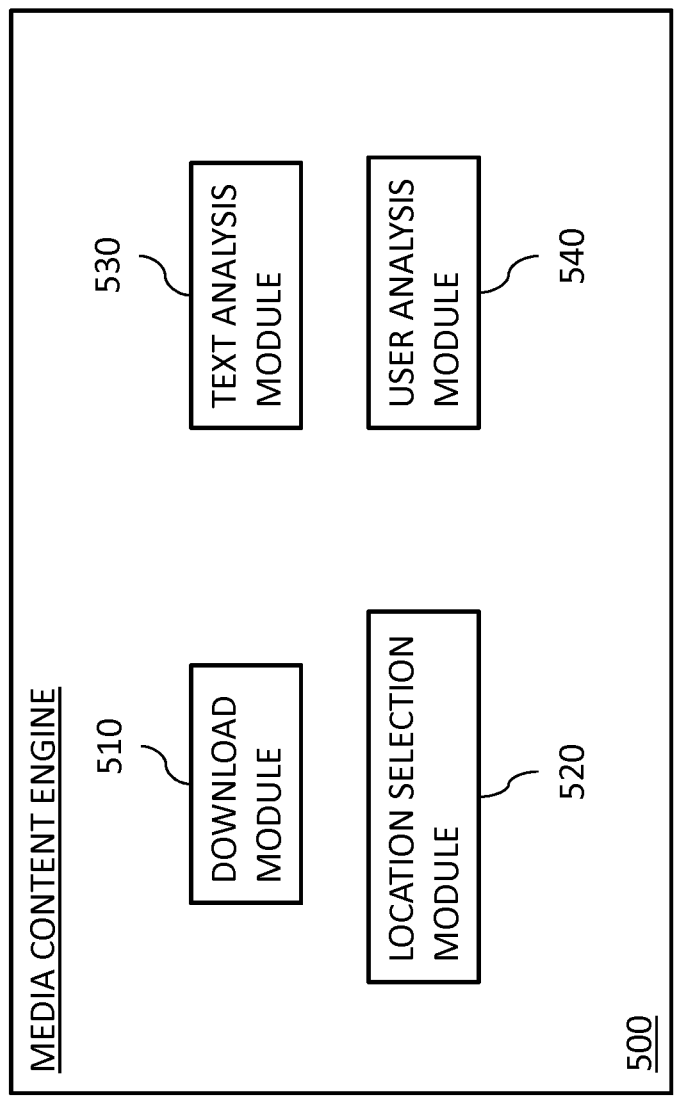
FIG. 5 is block diagram illustrating an example media content engine.

FIG. 5 illustrates an example media content engine 500. Media content engine 500 may, for example, be used as media content engine 428. As illustrated, media content engine 500 includes a download module 510, a location selection module 520, a context analysis module 530, and a user analysis module 540.

Download module 510 is responsible for obtaining the media content and its associated metadata. As part of this, download module 510 may seek media content for a user on a content server system and manage its download. Additionally, download module 510 may synchronize the metadata stored on the associated user device with that stored at a server system. Synchronization may, for example, include downloading previously generated metadata to the user device and/or uploading user generated metadata (e.g., bookmarks or highlights).

Location selection module 520 is responsible for selecting a location indicator for a media content item. To make an intelligent decision regarding where to jump back to or jump forward to, location selection module may evaluate a number of location indicators and associated location types for the media content, as discussed above. The location indicators and location types may be stored as media content metadata, which may be downloaded from a remote content server system and/or generated on the associate user device.

In general, a variety of location indicators and associated location types may be associated with the media content. The location indicators and associated location types may, among other things, be generated by the associated user, by analyzing the structure of the underlying text (e.g. book), by analyzing the text itself, and/or by others listening to the media content or reading text associated with the media content (e.g., on similar user devices).

Text analysis may be performed by text analysis module 530. Text analysis module 530 may analyze the underlying text to determine locations of interest. For example, by using a concordance routine, main characters, important places, and rising action sequences in texts may be determined. These may be key points of interest for a user to find in a book (whether in text or audio format). Techniques that may be used to build a concordance include natural language processing, computational linguistics, and/or n-grams.

Using the metadata regarding locations, location selection module 520 may make an intelligent decision regarding where to restart the output of audio output stream. For example, in certain implementations, a priority scheme for location types may be analyzed by the location selection module. Thus, if a high priority location (e.g., a user bookmark) and a low priority location (e.g., a main character is introduced) are near the current location in the audio content, the high priority location may be selected.

In certain implementations, the location indicators may also be analyzed in selecting a location in the media content. For example, if a higher priority location type (e.g., chapter beginning) is far from the current location (e.g., fifteen minutes) and a medium priority location type (e.g., main character introduction) is close to the current location (e.g., five minutes), the location indicator associated with the medium priority location type may be chosen. A lower priority location type (e.g., paragraph start) may, for instance, be chosen if higher and medium priority location types are distant from the current location.

If a user does not like the location that location selection module 520 selects (e.g., it is too not far back enough or too far back), the user may adjust the location. In certain implementations, through a user's attempts to try to find an appropriate location, user analysis module 540 may attempt to learn the location types to which the user likes to jump and/or preferred jump distances. If one or more types of preferred location indicators can be identified, user analysis module 540 may adjust the priority scheme in location selection module 520 to better match the preferences of the user. If a preferred jump time can be determined, user analysis module 540 may adjust a window within which location selection module 520 analyzes location indicators. User analysis module 540 may use any of a variety of machine learning techniques to determine a user's preferences (e.g., classification and regression trees, Bayesian estimation, neural networks, etc.). Machine learning techniques may, for example, attempt to classify a decision (e.g., a selected location) as a good fit or a bad fit (e.g., the user will or will not like this location) and then update its algorithm based on the actual fit (e.g., if the user accepts the selected location).

If media content engine 500 is to make an intelligent decision regarding where to start generating an audio output stream near the selected location indicator, text analysis module 530 may analyze text (e.g., words and punctuation) surrounding text associated with selected location indicator to determine a preferred starting location. Examples of preferred starting locations include the beginning of a paragraph or sentence. To identify paragraph beginnings, text analysis module may analyze the text for carriage returns or indents. To identify sentence beginnings, text analysis module 530 may analyze the text for periods followed spaces and a capital letter. Once an appropriate text location has been located by text analysis module 530, the text analysis module may access content synchronization information that maps one or more words in the associated text with a position of an identical word or words in the item of media content (e.g., the identical word or words that are spoken, sung, recited, etc. in the item of audio content). In some implementations, the synchronization information may indicate time positions and/or data locations within associated audio content that correspond to word, paragraph, chapter, section, or other positions within the textual content. The text may, for example, be analyzed before the playback of the media content has begun or in real time with the location indicator selection.

Figure 6:
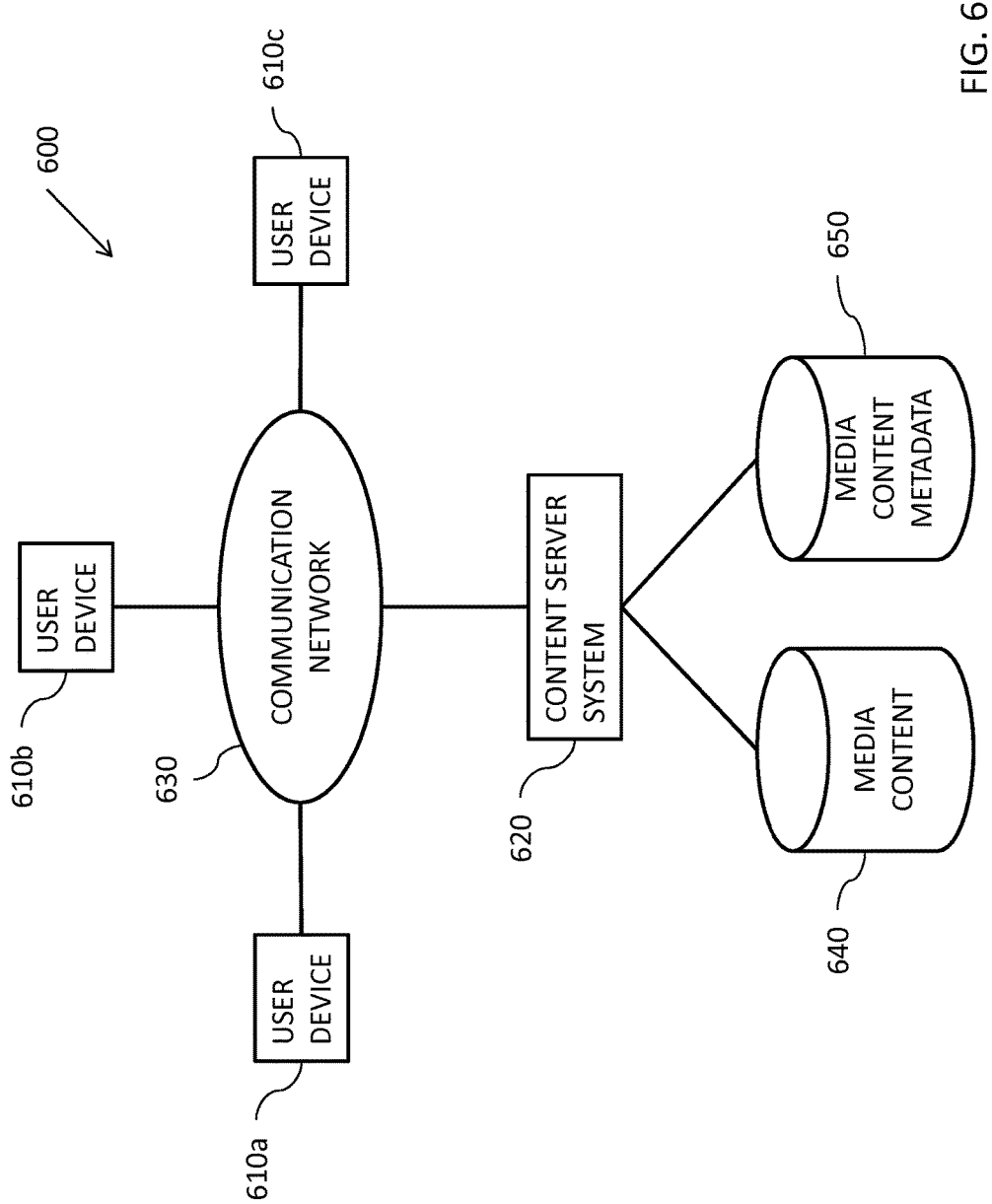
FIG. 6 is a schematic block diagram illustrating an example network environment for media content playback.

FIG. 6 illustrates an example network environment 600 for managing media content playback. Network environment 600 includes a number of user devices 610 and a content server system 620 coupled together through a communication network 630. Coupled to content server system 620 are a media content data store 640 and a media content metadata data store 650. The constituents of network environment 600 may be in communication with each other either locally or over communication network 630.

User devices 610 may be any computing device capable of receiving data and presenting it to a user. User devices 610 may, for example, receive media content through communication network 630 from content server system 620 and present the media content to a user. User devices 610 may, for example, be laptops, tablet computers, personal computers, PDAs, hybrid PDA/mobile phones, smartphones, wearable computing devices, GPS devices, electronic book readers, set-top or other television boxes, cameras, audiobook players, digital media players, video game consoles, in-store kiosks, televisions, appliances, electronic devices for inclusion in vehicles or machinery, gaming devices, or the like. User devices 610 may, for example, be structured and operate similar to user device 400.

User devices 610 may further be capable of accessing network resources, such as content pages, via communication network 630. In some implementations, continuously presented media content may be presented through these content pages by user devices 610 (e.g., by media content and/or media content metadata being streamed over network 630 to user devices 610). In other implementations, media content and/or media content metadata presented by user device 610 may be retrieved from data stores that are local to the user devices.

Communication network 630 may be any wired network, wireless network, or combination thereof. In addition, communication network 630 may be a personal area network, a local area network, a wide area network, a cable network, a satellite network, a cellular telephone network, or a combination thereof. In particular implementations, communication network 630 may be a publicly accessible network of linked networks, possibly operated by various distinct parties, such as the Internet. In some implementations, communication network 630 may be a private or semi-private network, such as a corporate or university intranet. Communication network 630 may include one or more wireless networks, such as a Global System for Mobile Communications (GSM) network, a Code Division Multiple Access (CDMA) network, a Long Term Evolution (LTE) network, or any other type of wireless network. Communication network 630 may use protocols (e.g., HTTP, TCP/IP, and UDP) and components for communicating via the Internet or any of the other aforementioned types of networks. Protocols and components for communicating via the Internet or any of the other aforementioned types of communication networks are well known to those skilled in the art of computer communications and thus, need not be described in more detail herein.

In some implementations, content server system 610 includes a processing device that may perform a variety of operations for managing media content playback. For example, content server system 620 may retrieve media content from media content data store 640. Content server system 620 may also determine visual content, including the layout and/or order of such content, for presentation during playback of media content on user devices 610. In some implementations, content server system 620 may access media content metadata store 650 to retrieve data regarding locations of interest in a media content item.

As described in further detail below, content server system 620 may also retrieve location information from data sources via communication network 630, such as data regarding user bookmarks and highlights (e.g., as users listen, read, or watch media content).

Media content metadata store 650 may store, among other things, location indicators and location types for media content items. Media data metadata content store 650 may be embodied in hard disk drives, solid state memories, any other type of non-transitory computer-readable storage medium, and/or a file, a database, a relational database, stored in any such non-transitory computer-readable media accessible to content server system 620. Media content metadata store 650 may also be distributed or partitioned across multiple local and/or storage devices. In some implementations, media content metadata store 650 is a data storage web service.

Content server system 620 may also be in communication with a media content data store 640. Media content data store 640 may store items of media content, such as audiobooks, podcasts, news programs, musical works, ebooks, television programs, video clips, movies, multimedia content, video games, and/or other types of content. In some implementations, media content data store 640 may be embodied in various types of non-transitory computer readable storage similar to media content metadata store 650. In some implementations, media content metadata store 650 and/or media content data store 640 may store associated or companion content to the multimedia content being presented, such as an ebook and/or text file corresponding to an audiobook.

User devices 610 and content server system 620 may each be embodied in a plurality of devices. User devices 610 and/or content server system 620 may include a network interface, memory, processing unit, and non-transitory computer-readable medium drive, all of which may communicate with each other by way of a communication bus. Moreover, a processing unit may itself be referred to as a computing device. The network interface may provide connectivity over network 630 and/or other networks or computer systems. The processing unit may communicate to and from memory containing program instructions that the processing unit executes in order to operate user devices 610 and content server system 620. The memory generally includes RAM, ROM, and/or other persistent and/or auxiliary non-transitory computer-readable storage media.

It will be recognized that many of the devices described above are optional and that implementations of environment 600 may or may not combine devices. Furthermore, devices need not be distinct or discrete. Devices may also be reorganized in the environment 600. For example, content server system 620 may be represented in a single physical server or, alternatively, may be split into multiple physical servers. In some implementations, the entire content service may be represented in a single computing device, such as user device 610. Additionally, the environment 600 may not include a network 630.

In some implementations, user devices 610 may operate in an off-line mode and/or be disconnected from communication network 630 for periods of time. For example, user devices 610 may initially synchronize and/or download media content from content server system 620 via network 630. User devices 610 may then be optionally disconnected from network 620, and a user may consume media content in an off-line mode. As described in further detail below, a user may optionally generate location information for their own use, and this information may be shared with other users. Accordingly, such user generated location information may be generated by a user while user devices 610 are in an off-line mode. The user generated location information may be shared with content server system 620 when user devices 610 are reconnected to network 630. Furthermore, user devices 610 may receive updated media content and/or location information from content server system 620 when user devices 630 are reconnected to network 630. Therefore, user devices 610 and/or content server system 620 may operate in an asynchronous manner for sharing and/or distributing content.

Additionally, in some implementations, content server system 620 is implemented by one more virtual machines implemented in a hosted computing environment. The hosted computing environment may include one or more rapidly provisioned and/or released computing resources. The computing resources may include hardware computing, networking and/or storage devices configured with specifically configured computer-executable instructions. A hosted computing environment may also be referred to as a "cloud" computing environment.

In some modes of operations, user device 610*a* receives media content (e.g., an audiobook) from content server system 620. Media content for user device 610*a* may, for example, be selected by a user through a web browser or specialized user interfaces and downloaded to user device 610*a* from media content data store 640. Note that an entire piece of media content does not have to be received before playback can begin. For instance, a portion of the media content may be received, the playback may be started, and the rest of the media content may be received while the rest of the media content is delivered.

When a user desires to listen to a media content selection, the user may interface with user device 610 (e.g., through user interfaces and tactile sensors) to begin presentation of the media content (e.g., in audible format). In some implementations, the user interfaces may include web-browsers, which may be configured by content server system 620.

User interfaces typically include visual information associated with a media content items (e.g., a book). This visual information may also be metadata. In some implementations, during playback, the visual information corresponds to the audio content being generated. For example, a user device implementing the media content playback may be provided with content synchronization information that maps one or more words in the item of associated textual content with a position of an identical word or words in the item of audio content (e.g., the identical word or words that are spoken, sung, recited, etc. in the item of audio content). In some implementations, the synchronization information may indicate time positions and/or data locations within associated audio content that correspond to word, paragraph, chapter, section, or other positions within the textual content. For example, chapters of an ebook may be associated with start and/or end times of a chapter in the audiobook.

Once playback has begun, user device 610a may begin generating an audio output stream. At any point during the playback of the media content, a user may choose to adjust the playback position in the audio output stream. For example, at the current location, a user may select a smart jump back button, and user device 610a may select a location to which to jump back in the audio output stream. A user may also select smart jump forward button, and user device 610a may select a location to which to jump forward in the audio output stream.

To make an intelligent decision regarding where to move back to or move forward to, user interface device 610a may evaluate a number of location indicators and associated location types for the media content, as discussed above. The location indicators and location types may be stored as media content metadata. Metadata content at user device 610a may be downloaded from media content metadata store 650 and/or generated on user device 610a.

As discussed previously, a variety of location indicators and associated location types may be associated with a media content item (e.g., an audiobook). The location indicators and associated location types may, among other things, be generated by the user of user device 610a, by analyzing the structure of the underlying text (e.g. book), by analyzing the text itself, and/or by others listening to the media content or reading the underlying text of the media content (e.g., on similar user devices). These location indicators and location types may be stored as metadata regarding the media content.

As two examples of location indicators and location types, as a user is listening to audible output of media content, she may place bookmarks at certain points and/or highlight certain passages of accompanying text being displayed. The bookmarks and/or highlights may, for example, be designated through a bookmark button and a highlight button. A user may select a bookmark button whenever she wants to designate a place in the audio output stream item to which she is listening. A bookmark is typically associated with a specific location in the media content, as opposed to a traditional physical bookmark in a book. A user may also highlight text whenever she would like using a highlight button. User bookmarks and highlighted passages provide indications of locations at which the user may be interested in returning.

User bookmarks and/or user highlights may be downloaded from server content system 620 and/or received at user device 610a. The bookmarks and highlights may be downloaded from server content system 620, for example, if they have been previously designated by a user (either on user device 610a or another user device 610) for the media content item. Services such as Whispersync from Amazon.com already provide this capability. The bookmarks and highlights may be received at user device 610a as a user listens to the media content item and stored in a local metadata store.

In certain implementations, third-party bookmarks and highlights may also be determined by content server system 620 and sent to user device 610a as metadata. For example, as noted above, as users of user devices 610 designate bookmarks and highlights in media content, the bookmarks and highlights may be sent to content server system 620 so that they may be available to a user on multiple devices (e.g., tablet, e-reader, and laptop). Content server system 620 may collect these bookmarks and highlights in a non-user identifying manner and store them in metadata store 650.

In particular implementations, content server system 620 may analyze bookmarks and highlights of third parties before allowing them to be used as location information for a media content item. For example, content server system 620 may calculate the frequency with which bookmarks and/or highlights occur for certain portions of the media content item. If certain bookmarks and highlights appear with relatively higher frequency across a number of users, these bookmarks and highlights may indicate areas of the media content item that multiple users have found to be interesting. Thus, these bookmarks and highlights may provide a strong indication of interesting locations in the media content.

In certain implementations, server content system 620 may also analyze the text underlying audio content to determine media content metadata. As an example, an analysis of the underlying text itself may locate natural breaks in the underlying text (e.g., chapter breaks, section breaks, etc.). Chapter breaks may, for example, also be manifest in the media content (e.g., as different portions of a media item). This analysis may also be obtained and/or supplemented by analyzing the text.

In some implementations, the underlying text of the audio content may be analyzed to determine locations of interest. For example, by using a concordance program, main characters, important locations, and rising action sequences in texts may be determined. These may be key points of interest for a user to find a book (whether in text of audio format). Techniques that may be used to build a concordance include natural language processing, computational linguistics, and/or n-grams.

Using the metadata regarding locations, an intelligent decision may be made regarding where to restart an audio output stream for media content. The decision may be made by user device 610 according to the various processes discussed previously. For example, in certain implementations, a priority scheme of location indicator types may be analyzed. Thus, if a high priority location (e.g., a user bookmark) and a low priority location (e.g., a main character is introduced) are near the current place in the audio content, the high priority location may be selected.

In certain implementations, the location indicator may also be analyzed in selecting a location in the media content. For example, if a higher priority location type (e.g., chapter beginning) is far from the current location in the audio output stream (e.g., fifteen minutes) and a medium priority location type (e.g., main character introduction) is close to the current location (e.g., five minutes), the location indicator associated with the medium priority location type may be chosen. A lower priority location type (e.g., paragraph start) may, for instance, be chosen if higher and medium priority location types are distant from the current location.

Network environment 600 provides a variety of features. For example, user devices 610 are provided with media content and metadata regarding the media content that allows a user to intelligently move to preferred locations in an audio output stream for media content. When listening to audio content especially, a user may often become distracted. Trying to rewind to a point which the user remembers in an audio output stream can often be quite cumbersome (e.g., with a number of overshoots and undershoots). Network environment 600, however, allows a user to quickly find one or more potentially interesting locations, at which they may be able to reengage with the media content in a meaningful manner.

Although FIG. 6 illustrates an example, network environment, other network environments for managing media content playback may include fewer, additional, and/or a different combination of elements. For example, the media content metadata may be stored as part of the media content. That is, there may not be two separate stores. Moreover, the one or more data stores may be part of the content server system.

Figure 7:
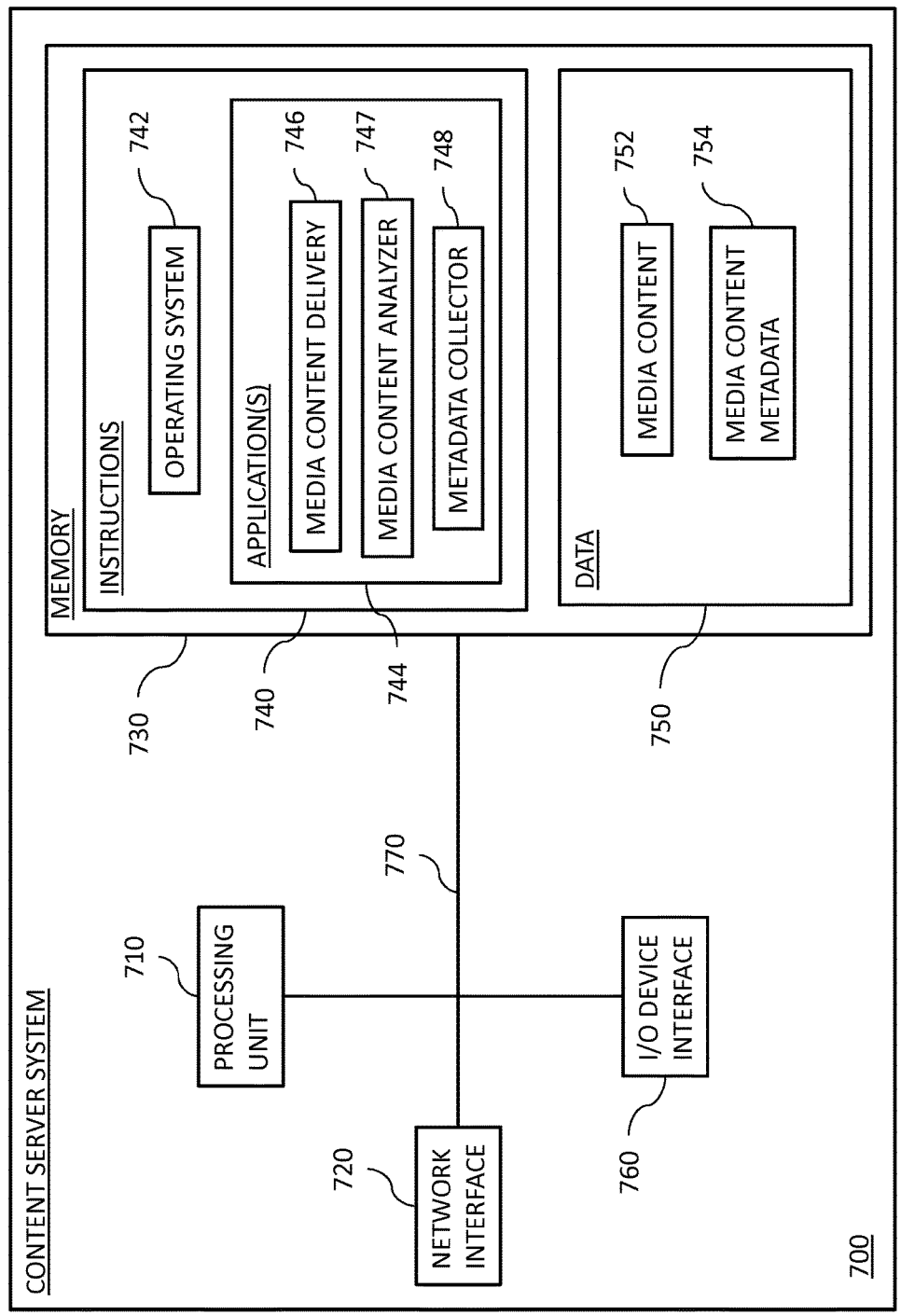
FIG. 7 is a schematic block diagram illustrating an example content server system for media content playback.

FIG. 7 illustrates an example content server system 700. Content server system 700 includes an arrangement of computer hardware and software components that may be used in managing media content playback. Content server system 700 may, for example, be used as content server system 620 in network environment 600.

Content server system 700 includes a processing unit 710, a network interface 720, memory 730, and an input/output device interface 760, all of which may communicate with one another by way of a communication network 770.

Processing unit 710 may include one or more processors (e.g., one or more microprocessors). The processors could, for instance, operate according to reduced instruction set computer (RISC) or complex instruction set computer (CISC) principles. In general, processing unit 710 may be any device that manipulates information in a logical manner.

Network interface 720 may provide content server system 700 with connectivity to one or more networks or computing systems. Processing unit 710 may thus receive information and instructions from other computing systems (such as user devices) or services via a communication network. Processing unit 710 may also communicate to and from memory 730.

Memory 730 may, for example, include random access memory (RAM), read-only memory (ROM), disc memory, and/or other persistent or non-transitory computer-readable storage media. Various items may be stored in different portions of memory 730 at various times (e.g., on a disc and in RAM). Memory 730, in general, may be any combination of devices for storing information.

Memory 730 includes instructions 740 and data 750. Instructions 740 include an operating system 742 (e.g., Windows, Linux, or Unix), which provides general administration and operation of content server system 700, and one of more applications 744 that processing unit 710 executes in order to provide media content and media content metadata to user devices. Applications 744 include a media content delivery module 746, which is responsible for sending media content and associated metadata to user devices, a media content analyzer module 747, which is responsible for analyzing media content for locations of interest, and a metadata collector module 748, which is responsible for assembling metadata for media content. Data 750 includes the data required for and generated by applications 740. For instance, data 750 includes a media content data store 752 for holding media content items (e.g., audiobooks) and media content metadata store 754, which may hold, among other things, location information (e.g., location indicators and location types) regarding media content.

Input/output device interface 760 allows one or more user devices (e.g., keypads, displays, speakers, cameras, microphones, etc.) to communicate with content server system 700. A communication interface may, for instance, be a network interface card (whether wireless or wireless), a bus (e.g., parallel or serial), or any other device for interfacing with a user interface device.

In some modes of operations, content server system 700 may provide a media content item (e.g., an audiobook) to a user device upon request. Media content for a user device may, for example, be selected by a user through a web browser or specialized user interfaces and sent to the user device from media content data store 752. Note that an entire item of media content does not have to be received before playback can begin. For instance, a portion of the media content may be received, the playback may be started, and the rest of the media content may be received while the rest of the media content is delivered.

Content server system 700 may also send metadata content associated with a media content item to a user device. The metadata content may, for example, be text associated with the media content item. The text may, for example, allow immersion reading to take place on the user device.

Additionally, content server system 700 may send information that identifies various locations in the media content item (e.g., location indicators and location types) to a user device. The location information may allow the user device to make an intelligent decision regarding where to jump back to or jump forward to during playback.

Content server system 700 may generate and/or collect the location information. To generate the location information, media content analyzer module 747 to analyze the underlying text itself. The location information may be placed in media content metadata store 754.

As an example of generating location information, an analysis of the underlying book itself may locate natural breaks in the underlying text (e.g., chapter breaks, section breaks, etc.). Chapter breaks may, for example, also be manifest in the media content (e.g., as different portions of a media item). This analysis may also be obtained and/or supplemented by analyzing the text.

In some implementations, the underlying text of the book may be analyzed to determine locations of interest. For example, by using a concordance routine, main characters, important locations, and rising action sequences in texts may be determined. These may be key points of interest for a user to find a book (whether in text of audio format). Techniques that may be used to build a concordance include natural language processing, computational linguistics, and/or n-grams.

Using metadata collector module 748, content server system 700 may also collect location information from other sources. In particular implementations, content server system 700 may collect bookmarks and highlights of media content by various users. These bookmarks and highlights may be useful as locations of interest for a media content item and stored in media content metadata store 754. As a user is listening to audible output of media content, she may place bookmarks at certain points and/or highlight certain passages of accompanying text being displayed. The bookmarks and/or highlights may, for example, be entered through selecting a bookmark button and a highlight button. A user may select a bookmark button whenever she wants to mark a place in the media content item to which she is listening. A bookmark is typically associated with a specific location in the media content, as opposed to a traditional physical bookmark in a book. A user may also highlight text whenever she would like using highlight button. User bookmarks and highlighted passages provide indications of points at which user may be interested in returning.

User bookmarks and/or user highlights may be sent to server content system 700 to allow a user to maintain consistency across various devices for a user (e.g., tablet, e-reader, and laptop). Services such as Whispersync from Amazon.com already provide this capability. Metadata collector module 748 may assemble these bookmarks and highlights in a non-user identifying manner and store them in metadata store 754.

In certain implementations, metadata collector module 748 may analyze bookmarks and highlights of third parties before designating them as metadata to be sent to a user device. For example, module 748 may calculate the frequency with which bookmarks and/or highlights occur for certain portions of the media content item. If certain bookmarks and highlights appear with relatively higher frequency across a number of users, these bookmarks and highlights may indicate areas of the media content item that multiple users have found to be interesting. Thus, these bookmarks and highlights may provide a strong indication of interesting subject matter and may be selected as ones to be sent to user devices.

Content server system 700 provides a variety of features. For example, it provides user devices with media content and metadata regarding the media content that allows a user to intelligently move to preferred locations in media content. When listening to audio content especially, a user may often become distracted. Trying to move to a location at which the user remembers in media content can often be quite cumbersome (e.g., with a number of overshoots and undershoots). Content server system 700, however, allows a user to quickly find one or more potentially interesting locations, at which they may be able to reengage with the media content in a meaningful manner.

Although FIG. 7 depicts a general architecture of a content server system, those skilled in the art will appreciate that a content server system may include fewer, additional, and/or a different arrangement of components than those shown in FIG. 7. For example, content server system 700 may include a number of processing units and/or network interfaces. As another example, media content metadata 754 may be part of media content 752. As another example, content server system 700 may be associated with, or in communication with, a display and/or an input device. The display and input device may, for example, be used in implementations in which users interact directly with content server system 700, such as an integrated in-store kiosk or integrated component for inclusion in an automobile, boat, train, or airplane, for example.

Figure 8:
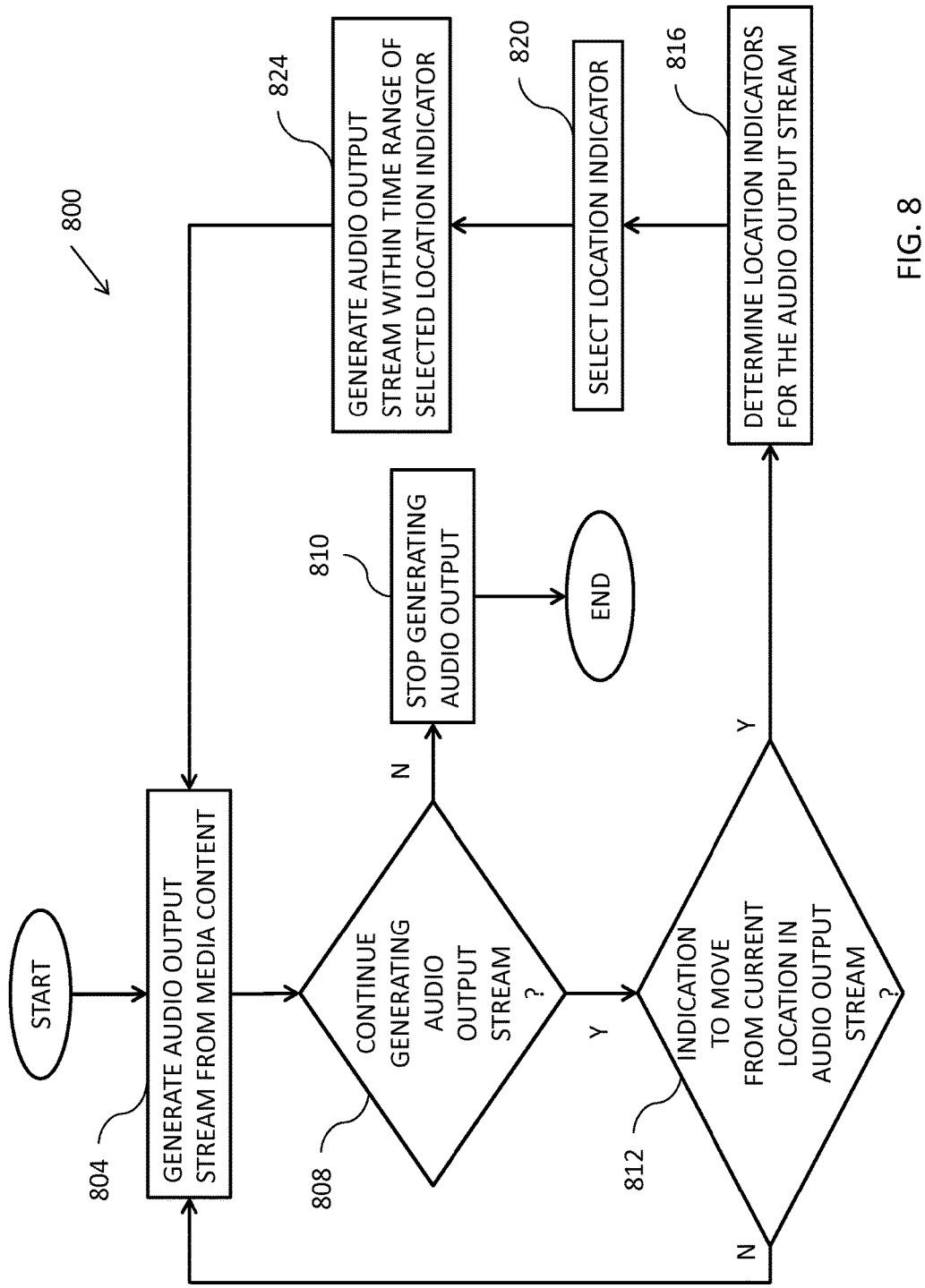
FIG. 8 is a flowchart illustrating an example process for managing media content playback.

FIG. 8 illustrates an example process 800 for managing media content playback. Process 800 may, for example, be implemented by user device 100, user device 400, or one of user devices 61.

Process 800 calls for generating an audio output stream from media content (operation 804). Generating an audio output stream may, for example, begin when a user device receives user input. For example, the user input may be received as a result of the user interaction with the user device (e.g., tapping a touchscreen of the device and/or other input mechanisms available to a user). User input may be received via user interface controls to navigate the media content and select media content to be presented to the user. User input may or may not also include data to start the playback of the media content. For example, playback of media content may initiate automatically without the receipt of user input and/or user interaction data.

Process 800 also calls for determining whether to continue generating the audio output stream from the media content (operation 808). For example, if the current playback location has reached the end of an audiobook or a portion thereof (e.g., a chapter), the audio output stream may be stopped. As another example, a determination may be made as to whether an indication to stop generating audio output has been received. An indication to stop generating audio output may, for example, be received when a user no longer desires to receive audio output (e.g., by stopping or pausing the playback). The indication may, for example, be received as a result of user interaction with the user device (e.g., tapping a touchscreen of the device and/or other input mechanisms available to a user). In general, determining means calculating, identifying, locating, retrieving, accessing, or otherwise obtaining data or making a decision.

If generating the audio output stream from the media content should not continue, process 800 calls for stopping the generation of the audio output from the media content (operation 810). Process 800 is then at an end.

If, however, generating the audio output stream from the media content should continue, process 800 calls for determining whether an indication to move from the current location in the audio output stream has been received (operation 812). An indication to move from the current location in the audio output stream may, for example, be received when a user is unfamiliar with the media content currently being output (e.g., they became distracted) or the user is at a familiar place in the media content (e.g., they have heard the content before). The indication may, for example, be received as a result of user interaction with the user device (e.g., tapping a touchscreen or button of the device and/or other input mechanisms available to a user). The associated input device may indicate a fixed jump back, which may be augmented by an intelligent location selection, or a completely intelligent location selection. If no indication to move from the current location in the audio input stream has been received, process 800 calls for continuing to generate the audio output stream from the media content (operation 804).

If an indication to move from the current location in the audio output stream has been received, process 800 calls for determining a number of location indicators for the audio output stream (operation 816). As discussed previously, location indicators may, for example, designate a time in the audio output stream. The location indicators may correspond to a word or phrase position in the media content and may be generated by user input (e.g., bookmarks), analysis of an associated text's structure (e.g., chapter breaks), textual analysis of the associated text (e.g., main character introduction, rising action, etc.), and/or by other users consuming the media content (e.g., highlights). The location indicators may be generated by the user device, a content server system, and/or third party user devices and stored locally on the user device and/or retrieved from a content server system. These location indicators and location types may be stored as metadata regarding the media content.

For example, as a user is listening to audible output of media content, she may place bookmarks at certain points and/or highlight certain passages (e.g., if accompanying text is being displayed). The bookmarks and/or highlights may be entered through user controls (e.g., a touch-sensitive screen or buttons) on a user device. For instance, a user may select a bookmark button whenever she wants to mark a location in the media content to which she is listening. The media content location may be converted to a location indicator for the audio output stream.

As another example, an analysis of the underlying book itself may locate natural breaks in the underlying text (e.g., chapter breaks, section breaks, etc.). Chapter breaks may, for example, also be manifest in the media content (e.g., as different sections of a media item). This analysis may also be obtained and/or supplemented by analyzing the text. Analyzing the book structure may be performed by a user device and/or a content server system.

In certain implementations, the underlying text of the book may be analyzed to determine locations of interest. For example, by using a concordance program, main characters, important locations, and rising action sequences in texts may be determined. These may be key points of interest for a user to find in a book (whether in text or audio format). Techniques that may be used to build a concordance include natural language processing, computational linguistics, and/or n-grams. Analyzing the underlying text may be performed by a user device and/or a content server system.

In some implementations, locations of interest may be determined by users of other user devices that are listening to the same media content or reading text versions of the same media content. For example, other users may bookmark certain locations and/or highlight certain passages. The locations identified by other users may be sent to a content server system and passed to the user device. Designations of media content locations from various users at the content server system may be aggregated together (e.g., in a non-user-identifying manner) to determine a number of locations of interest for the media content.

Location indicators may be a playback time, a word position, or any other data for specifying a point in media content. Each location may have a location indicator (e.g., a timestamp in the audiobook) and a location type (e.g., chapter break, section break, user bookmark, etc.). Location indicators and location types may be stored as data associated with the media content (i.e., metadata). The metadata may actually be stored with the media content or as affiliated data.

Determining location indicators may, for example, be accomplished by analyzing location indicators to identify those within a predetermined range (e.g., a time range or text range) of the current location. Additionally, the direction of desired movement may be taken into account. For instance, if an indication is received that a user wants to jump backward in the audio output stream, only those location indicators indicating location before the current location may be examined. Moreover, the location indicators may have to be within a time range (e.g., five minutes) to be of interest.

Process 800 also calls for selecting a location indicator (operation 820). Selecting a location indicator may, for example, include evaluating the location types associated with the determined location indicators. In general, a variety of location indicators and associated location types may be associated with the media content.

Using location indicators and location types, a determination may be made regarding where to restart the output of the audio content. For example, in certain implementations, a priority scheme for location types may be analyzed. Thus, if a high priority location (e.g., a user bookmark) and a low priority location (e.g., a main character is introduced) are near the current location (or anticipated restart location) in the audio output stream, the high priority location may be selected. Moreover, a user may personalize the priority scheme through user preferences, and a user device learn preferred location types.

In certain implementations, the location indicators may also be analyzed in selecting a location in the media content. For example, if a higher priority location type (e.g., chapter beginning) is far from the current location (e.g., fifteen minutes) and a medium priority location type (e.g., main character introduction) is close to the current location (e.g., five minutes), the location indicator associated with the medium priority location type may be chosen. A lower priority location type (e.g., paragraph start) may, for instance, be chosen if higher and medium priority location types are distant from the current location. Additionally, if a user has activated a fixed jump back button (e.g., 30 s), the time range of locations under consideration may be constrained.

Process 800 further calls for generating the audio output stream within a time range of the selected location indicator (operation 824) and returning to generate the audio output stream from the media content (operation 804). In some modes of operation, the audio output stream may be restarted right at the selected location indicator. In other implementations, the text of the associated book may be analyzed (e.g., a priori or in real-time) to determine a preferred starting location near (e.g., within 15 s) the location indicator (e.g., at the beginning of a paragraph or the beginning of a sentence). The audio output stream may then begin at that point.

Although FIG. 8 illustrates one example process for managing media content playback, other processes for managing media content playback may include fewer, additional, and/or a different arrangement of operations. For example, although discussed in terms of audio playback, other forms of media output (e.g., video) may be generated. Additionally, a process may include generating location indicators. As another example, two or more operations may be performed in a contemporaneous or simultaneous manner.

Figure 9:
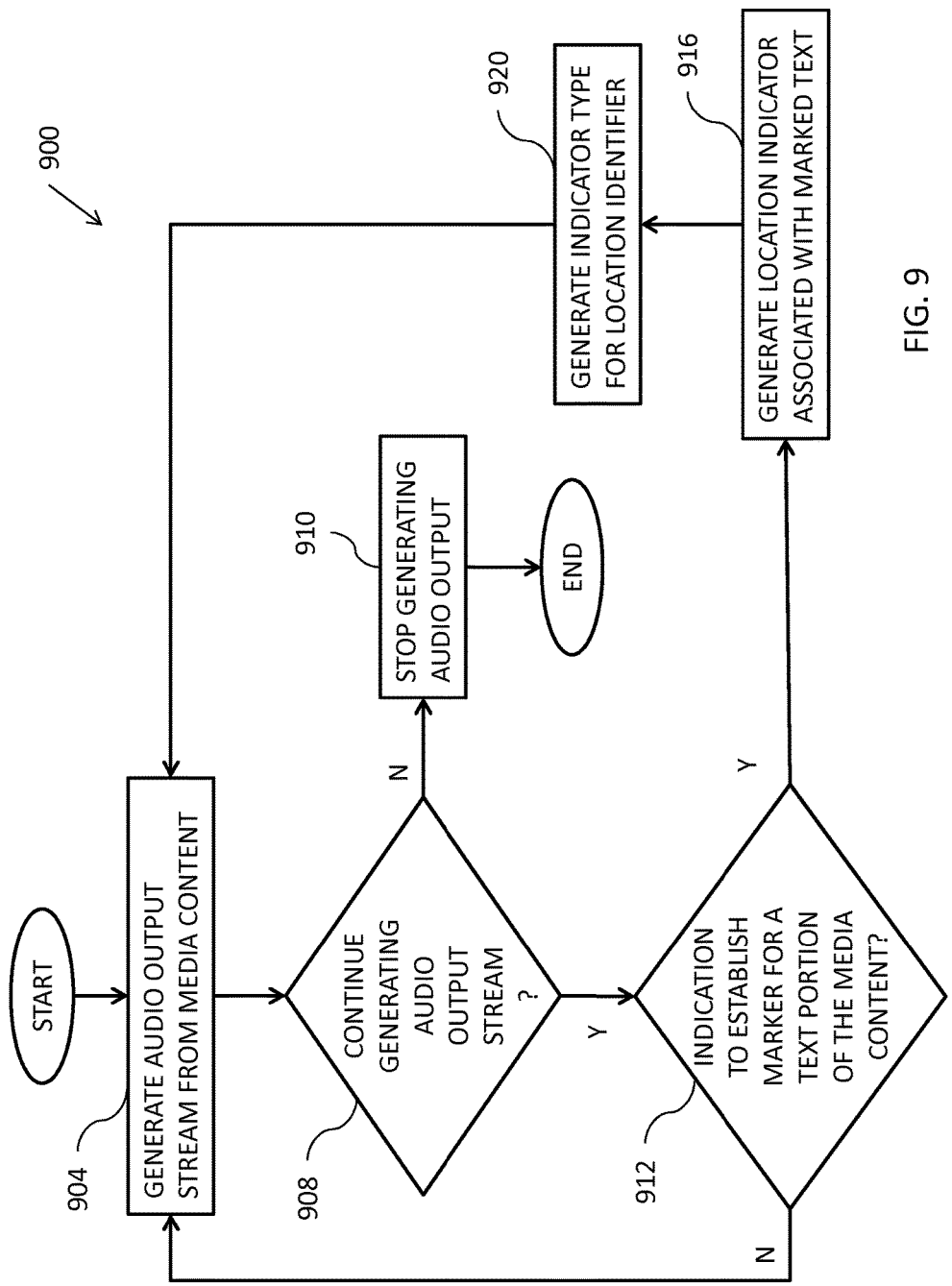
FIG. 9 is a flowchart illustrating an example process for managing media content playback.

FIG. 9 illustrates an example process 900 for managing media content playback. Process 900 may, for example, be implemented by user device 300, user device 400, or one of user devices 610. Process 900 could, for example, be used in conjunction with process 800.

Process 900 calls for generating an audio output stream from media content (operation 904). Generating an audio output stream may, for example, begin when a user device receives user input. User input may be received via user interface controls to navigate the media content and select media content to be presented to the user. User input may also include data to start the playback of the media content.

Process 900 also calls for determining whether to continue generating an audio output stream from the media content (operation 908). For example, if the current playback position has reached the end of an audiobook or a portion thereof (e.g., a chapter), the audio output may be stopped automatically. As another example, a determination may be made as to whether an indication to stop generating audio output has been received. An indication to stop generating audio output may, for example, be received when a user no longer desires to receive audio output (e.g., by stopping or pausing the playback). The indication may, for example, be received as a result of user interaction with the user device (e.g., tapping a touchscreen of the device and/or other input mechanisms available to a user). If generating an audio output stream from the media content should not continue, process 900 calls for stopping the generation of the audio output from the media content (operation 910), and process 900 is at an end.

If, however, generating an audio output stream from the media content should continue, process 900 calls for determining whether an indication to establish a marker for text associated with the media content has been received (operation 912). An indication to establish a marker for text associated with the media content may, for example, be received when a user desires to designate a place in the text (e.g., because she wants to stop or because she likes the content). The indication may, for example, be received as a result of user interaction with the user device (e.g., tapping a touchscreen of the device and/or other input mechanisms available to a user). If no indication to establish a marker has been received, process 900 calls for continuing to generate the audio output stream from the media content (operation 904).

If an indication to establish a marker for text associated with the media content has been received, process 900 calls for generating a location indicator associated current location marked text (operation 916). As discussed previously, location indicators may, for example, designate a time in audio output stream. Process 900 also calls for generating an indicator type (e.g., bookmark or highlight) for the location indicator (operation 920). The location indicator and the indicator type may be stored locally on a user device as metadata associated with the media content. In certain implementations, the location indicator and the indicator type may also be sent to a content server system for storage. On a content storage system, the location indicator and the indicator type may also be stored as metadata for the media content. The metadata on the content server system may be sent to other user devices of the same user or to user devices of other users.

Process 900 also calls for continuing to generate the audio output stream from the media content (operation 904).

Although FIG. 9 illustrates one example process for managing media content playback, other processes for managing media content playback may include fewer, additional, and/or a different arrangement of operations. For example, the indication to establish a marker for text associated with the media content may occur after the audio output stream has stopped being generated. For instance, a user may choose to stop hearing the audio output and then choose to bookmark her current location. As an additional example, two or more operations may be performed in a contemporaneous or simultaneous manner.

Figure 10:
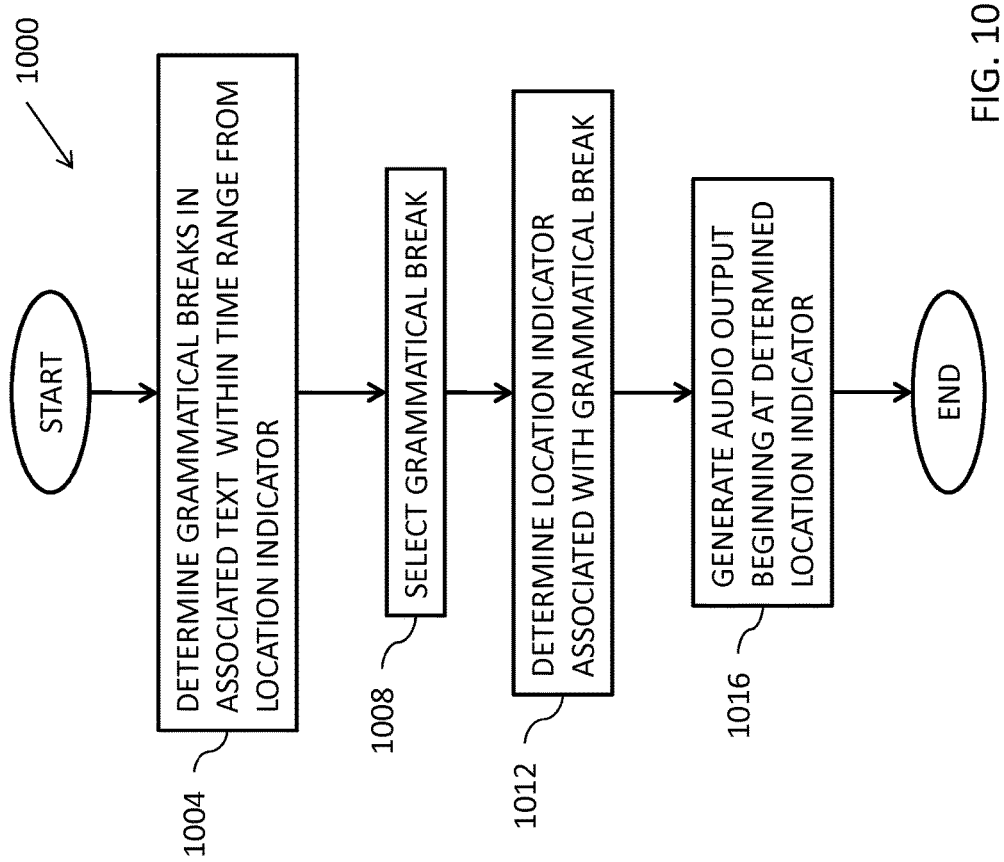
FIG. 10 is a flowchart illustrating an example process for managing media content playback.

FIG. 10 illustrates an example process 1000 for managing media content playback. Process 1000 may, for example, be implemented by user device 100, user device 400, or one of user devices 610. Process 1000 could, for example, illustrate the features of operation 824 in process 800.

Process 1000 calls for determining one or more grammatical breaks in text associated with the media content within a time range from a location indicator (operation 1004). Determining grammatical breaks could, for example, be accomplished by analyzing the text (e.g., words and punctuation) in the vicinity of the text that corresponds to the location indicator. Text data representing words spoken within the audio content stream may, for instance, be retrieved. For example, the text data associated with an audiobook may be retrieved from a synchronization and/or mapping file stored in the user device. In some implementations, a mapping file may include time units that correspond to each word of the text data. By analyzing the words and punctuation (e.g., periods, spaces, and carriage returns) near the text associated with the selected location indicator, various grammatical breaks (e.g., paragraph and sentence beginnings) may be determined.

In certain implementations, a configurable time window to analyze the text near the selected location indicator may be used. In some implementations, the configurable window may be associated with the distance between the current playback position and the selected location indicator. This may, for example, be expressed as a percentage (e.g., 10%). For instance, if the selected location indicator is 500 seconds from the current playback location, an appropriate starting location may be searched for within 50 seconds of the selected location indicator. The text for appropriate starting locations (e.g., paragraph beginnings or sentence beginnings) within the window of the selected location indicator (e.g., 50 seconds before to 50 seconds after the selected location indicator) may then be determined.

Process 1000 also calls for selecting a grammatical break (operation 1008). Selecting a grammatical break may, for example, be accomplished by analyzing a priority scheme for grammatical breaks. One example priority scheme is paragraph start, sentence start, word start (in decreasing order or priority). Thus, if a paragraph start is found near the selected location indicator, the paragraph start may be used. If no paragraph start is found, a sentence start may be used.

Process 1000 also calls for determining a location indicator associated with the grammatical break (operation 1012). The location indicator may, for example, be determined by analyzing a synchronization and/or mapping file for the media content. Process 1000 additionally calls for generating the audio output stream beginning at the determined location indicator (operation 1016). Process 1000 is then at an end.

FIG. 11 illustrates another example process 1100 for managing media content playback. Process 1100 may, for example, be implemented by user device 100, user device 400, or one of user devices 610. Process 1100 could, for example, illustrate the features of operation 820 in process 800.

Process 1100 calls for determining whether multiple location indicators exist for a media content item (operation 1104). Location indicators could, for example, be associated with bookmarks and highlighting (whether from the user or other users), section breaks in the associated text, main character introductions, and rising action in the story. The location indicators may be stored as metadata for the media content and analyzed to determine whether multiple location indicators are present. In certain implementations, only location indicators within a given time window may be relevant. This may assist in limiting the number of location indicators under consideration.

If multiple location indicators do not exist, process 1100 is at an end. If, however, multiple location indicators do exist, process 1100 calls for generating an interface presenting the location options (operation 1108). The location options may include the location indicators for media content and the associated indicator types (e.g., bookmarks, highlighting, main character introductions, etc.). The location options may be presented in a variety of formats. For example, the location options could be presented in a list ordered based on proximity to the current location an audio output stream for the media content. As another example, the location options could be presented in a manner that graphically illustrates the locations of the location indicators. For example, the location options could be presented as shown in FIG. 2.

Process 1100 also calls for determining whether a location option has been selected (operation 1112). A location option may, for example, be selected by a user of a user device via user interface controls. If a location option has not been selected, process 1100 calls for waiting for a location option to be selected. Once a location option is selected, process 1100 calls for selecting a location indicator based on a selected location option (operation 1116). Selecting a location indicator based on the selected location option may, for example, be performed by determining the location indicator associated with the selected location option. Process 1100 is then at an end.

The various illustrative logical blocks and modules described in connection with the implementations disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conjunctive language such as the phrase "at least one of X, Y and Z," unless specifically stated otherwise, is otherwise understood with the context as used in general to convey that an item, term, etc. may be either X, Y, or Z, or a combination thereof. Thus, such conjunctive language is not generally intended to imply that certain implementations require at least one of X, at least one of Y, and at least one of Z to each be present.

Conditional language such as, among others, "can," "could," "might" or "may," unless specifically stated otherwise, are otherwise understood within the context as used in general to convey that certain implementations include, while other implementations do not include, certain features, elements and/or steps. Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular embodiment.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the implementations described herein in which elements or functions may be deleted or executed out of order from that shown or discussed, including substantially concurrently or in reverse order, depending on the functionality involved as would be understood by those skilled in the art.

A number or implementations for managing media content playback have been described, and several others have been mentioned or suggested. Moreover, those of ordinary skill in the art will readily recognize that the number of additions, deletions, substitutions, and modifications may be made to the implementations while still achieving media content playback management. Thus, the scope of the protected subject matter should be judged based on the following claims, which may encompass one or more aspects of one or more of the implementations.

What is claimed is:

1. A user device for managing audio playback of media content, the user device comprising:
    a network interface adapted to receive the media content over a communication network;
    a data store configured to store the media content and location data, the location data including at least a first timestamp associated with a first location in the media content and a second timestamp associated with a second location in the media content;
    a touch screen adapted to receive input; and
    a processing unit adapted to communicate with the data store and configured to at least:
        output first audio representing a first portion of the media content;
        detect an indication to move from a third location in the media content to a fourth location in the media content, the fourth location in the media content being at least one of before or after the third location in the in the media content;
        determine, based at least in part on detecting the indication, that the first timestamp is within a time range of the third location, the first location in the media content being the at least one of before or after the third location in the media content, and the first timestamp being associated with a first location type, the first location type being associated with a first priority;
        determine, based at least in part on detecting the indication, that the second timestamp is within the time range of the third location, the second location in the media content being the at least one of before or after the third location in the media content, and the second timestamp being associated with a second location type, the second location type being associated with a second priority;
        select the first timestamp based at least in part on the first priority and the second priority;
        identify a second portion of the media content using the first timestamp; and
        output second audio representing the second portion the media content.

2. The system of claim 1, wherein the processing unit is further configured to:
    detect an indication to establish a marker for a text portion of the media content;
    determine a fifth location in the media content corresponding to the text portion; and
    generate a third timestamp associated with the text portion.

3. The system of claim 1, wherein the processing unit is further configured to:
    determine a fifth location in the media content that is within a predetermined time range from the first timestamp and at which a grammatical break occurs in text associated with the media content,
wherein the second portion of the media content begins at the fifth location.

4. A system for managing media content playback, the system comprising:
a data store configured to at least store media content; and
a processing unit adapted to communicate with the data store and configured to at least:
cause output of first audio representing a first portion of the media content;
detect an indication to move from a first location in the media content to a second location in the media content, the second location in the media content being at least one of before or after the first location in the media content;
determine, based at least in part on detecting the indication, a first location indicator associated with a third location in the media content, the third location in the media content being the at least one of before or after the first location in the media content, and the first location indicator being associated with a first location type that includes a first priority;
determine, based at least in part on detecting the indication, a second location indicator associated with a fourth location in the media content, the fourth location in the media content being the at least one of before or after the first location in the media content, and the second location indicator being associated with a second location type that includes a second priority;
based at least in part on the first priority and the second priority, select the first location indicator associated with the third location; and
cause, based at least in part on the first location indicator, output of second audio representing a second portion of the media content.

5. The system of claim 4, wherein the processing unit is further configured to:
determine that the first location indicator is within a predefined time range of the first location,
wherein to select the first location indicator is further based at least in part on the first location indicator being within the predefined time range from the first location.

6. The system of claim 4, wherein the first location type and the second location type include one or more of locations identified by a system user, locations identified by third parties, and locations identified from analyzing text associated with the media content.

7. The system of claim 4, wherein the processing unit is further configured to adjust a priority ranking for the first location type and the second location type based at least in part on a context of the media content for the first location.

8. The system of claim 4, wherein to select the first location indicator is further based at least in part on user preferences for location types.

9. The system of claim 4, wherein the processing unit is further configured to:
generate a user interface that presents a number of location options, the number of location options including at least the third location and the fourth location; and
detect input indicating the third location;
wherein to select the first location indicator is further based at least in part on the input.

10. The system of claim 4, wherein the processing unit is further configured to:
determine a fifth location in the media content that is within a predetermined time range from the first location indicator and at which a grammatical break occurs in text associated with the media content; and
identify the second portion of the media content based at least in part on the second portion of the media content beginning at the fifth location.

11. The system of claim 4, wherein the processing unit is further configured to:
detect an additional indication to establish a marker for a portion of text associated with the media content;
determine a fifth location in the media content corresponding to the portion of text; and
generate a third location indicator associated with the portion of text and an associated location type.

12. A method for managing media content playback at a user device, the method comprising:
outputting first audio representing a first portion of media content;
detecting an indication to move from a first location in the media content to a second location in the media content, the second location in the media content being at least one of before or after the first location in the media content;
determining, based at least in part on detecting the indication, a first location indicator associated with a third location in the media content, the third location in the media content being the at least one of before or after the first location in the media content, and the first location indicator being associated with a first location type that includes a first priority;
determining, based at least in part on detecting the indication, a second location indicator associated with a fourth location in the media content, the fourth location in the media content being the at least one of before or after the first location in the media content and the second location indicator being associated with a second location type that includes a second priority;
based at least in part on the first priority and the second priority, selecting the first location indicator associated with the third location; and
outputting, based at least in part on the first location indicator, second audio representing a second portion of the media content.

13. The method of claim 12, further comprising:
determining that the first location indicator is within a predetermine time range of the first location,
wherein selecting the first location indicator is further based at least in part on the first location indicator being within the predefined time range from the first location.

14. The method of claim 12, wherein the first location type and the second location type include one or more of locations identified by a user, locations identified by third parties, and locations identified from analyzing text associated with the media content.

15. The method of claim 12, further comprising:
determining a ranking for the first location type and the second location type based at least in part on the first priority and the second priority,
wherein selecting the first location indicator comprises selecting the first location indicator using the ranking.

16. The method of claim 15, wherein:
the first location type includes a higher priority in the ranking than the second location type; and selecting the first location indicator using the ranking comprises selecting the first location indicator based at least in part on the first location type including the higher priority.

17. The method of claim 15, further comprising adjusting the ranking based at least in part on a context of the media content for the first location.

18. The method of claim 12, further comprising:
presenting a number of location options, the number of location options including at least the third location and the fourth location; and
detecting input indicating the third location,
wherein selecting the first location indicator is further based at least in part on the input.

19. The method of claim 12, further comprising:
determining a fifth location in the media content that is within a predetermined time range from the first location indicator and at which a grammatical break occurs in text associated with the media content; and
identifying the second portion of the media content based at least in part on the second portion of the media content beginning at the fifth location.

20. The method of claim 12, further comprising:
detecting an indication to establish a marker for a portion of text associated with the media content;
determining a fifth location in the media content corresponding to the portion of text; and
generating a third location indicator associated with the portion of text and an associated location type.

21. The system of claim 1, wherein:
the first timestamp is a first time period from the first location in the media content;
the second timestamp is a second time period from the first location in the media content; and
to select the first timestamp is further based on the first time period and the second time period.

22. The system of claim 4, wherein the processing unit is further configured to:
determining that the first location indicator is within a time range of the second location,
wherein determining the first location indicator is further based at least in part on the first location indicator being within the time range; and
determining that the second location indicator is within the time range of the second location,
wherein determining the second location indicator is further based at least in part on the second location indicator being within the time range.

23. The method of claim 12, further comprising:
determining that the first location indicator is within a time range of the first location, wherein determining the first location indicator is further based at least in part on the first location indicator being within the time range; and
determining that the second location indicator is within the time range of the first location, wherein determining the second location indicator is further based at least in part on the second location indicator being within the time range.

* * * * *